(12) United States Patent
Sinton et al.

(10) Patent No.: US 12,704,419 B2
(45) Date of Patent: Aug. 11, 2026

(54) CONTINUOUS FLOW CALORIMETER SYSTEMS AND RELATED METHODS

(71) Applicants: David Sinton, Toronto (CA); Mohammad Amin Kazemi, Toronto (CA); Mohammad Zargartalebi, North York (CA)

(72) Inventors: David Sinton, Toronto (CA); Mohammad Amin Kazemi, Toronto (CA); Mohammad Zargartalebi, North York (CA)

( * ) Notice: Subject to any disclaimer, the term of this patent is extended or adjusted under 35 U.S.C. 154(b) by 234 days.

(21) Appl. No.: 18/437,802

(22) Filed: Feb. 9, 2024

(65) Prior Publication Data

US 2024/0272017 A1 Aug. 15, 2024

Related U.S. Application Data

(60) Provisional application No. 63/444,650, filed on Feb. 10, 2023.

(51) Int. Cl.

| | |
|---|---|
| ***G01K 17/12*** | (2006.01) |
| ***G01K 7/02*** | (2021.01) |
| ***G01N 25/00*** | (2006.01) |
| ***G01N 25/20*** | (2006.01) |

(52) U.S. Cl.

CPC ............... *G01K 17/12* (2013.01); *G01K 7/02* (2013.01); *G01N 25/005* (2013.01); *G01N 25/20* (2013.01)

(58) Field of Classification Search

CPC ........... G01N 2/20; G01N 25/005; G01K 7/02

USPC ............................................................ 374/43

See application file for complete search history.

(56) References Cited

U.S. PATENT DOCUMENTS

| | | | |
|---|---|---|---|
| 3,263,484 A | 8/1966 | Watson et al. | |
| 3,589,184 A | 6/1971 | Moore | |
| 3,726,644 A | 4/1973 | Desnoyers et al. | |
| 3,834,873 A | 9/1974 | Picker | |
| 4,738,544 A | 4/1988 | Setier et al. | |
| 8,235,589 B1 * | 8/2012 | Feller | G01K 17/10 374/45 |

(Continued)

OTHER PUBLICATIONS

B. Wang and Q. Lin, "A MEMS differential-scanning-calorimetric sensor for thermodynamic characterization of Biomolecules," Journal of Microelectromechanical Systems, vol. 21, No. 5, pp. 1165-1171, 2012, doi: 10.1109/JMEMS.2012.2203788.

(Continued)

*Primary Examiner* — Mirellys Jagan

(57) ABSTRACT

A method for determining specific heat capacity of fluids includes: (a) injecting a reference fluid into at least one channel of a reference substrate and a sample fluid into at least one channel of a sample substrate; (b) establishing a temperature gradient along the at least one channel of each substrate; (c) measuring temperature differential between the reference and sample substrates along the temperature gradient for a stagnant condition to define a baseline temperature differential, and for each of a plurality of flowrate ratios of the reference and sample fluids flowing through respective channels; and (d) based on the measuring in (c), determining a thermally-balanced flowrate ratio at which the temperature differential corresponds to the baseline temperature differential, and evaluating the specific heat capacity of the sample fluid based on the thermally-balanced flowrate ratio.

19 Claims, 12 Drawing Sheets

(56) References Cited

U.S. PATENT DOCUMENTS

| | | | | |
|---|---|---|---|---|
| 10,175,123 | B2 | 1/2019 | Lin et al. | |
| 2008/0025365 | A1* | 1/2008 | Kawaguchi .......... | G01N 25/005 374/31 |
| 2014/0092935 | A1* | 4/2014 | Lin .................... | G01N 25/4893 374/10 |

OTHER PUBLICATIONS

P. Picker, P. A. Leduc, P. R. Philip, and J. E. Desnoyers, "Heat capacity of solutions by flow microcalorimetry," J Chem Thermodyn, vol. 3, No. 5, pp. 631-642, Sep. 1971, doi: 10.1016/S0021-9614(71)80084-8.

D. E. White and R. H. Wood, "Absolute calibration of flow calorimeters used for measuring differences in heat capacities. A chemical standard for temperatures between 325 and 600K," Journal of Solution Chemistry 1982 11:4, vol. 11, No. 4, pp. 223-236, Apr. 1982, doi: 10.1007/BF00657315.

W. Lee, W. Fon, B. W. Axelrod, and M. L. Roukes, "High-sensitivity microfluidic calorimeters for biological and chemical applications," Proceedings of the National Academy of Sciences, vol. 106, No. 36, pp. 15225-15230, Sep. 2009, doi: 10.1073/PNAS.0901447106.

S. Wang et al., "A power compensated differential scanning calorimeter for protein stability characterization," Sens Actuators B Chem, vol. 256, pp. 946-952, Mar. 2018, doi: 10.1016/J.SNB.2017.10.034.

B. Wang and Q. Lin, "A MEMS differential scanning calorimeter for thermodynamic characterization of biomolecules", IEEE Xplore, MEMS 2011, Cancun, Mexico, Jan. 23-27, 2011, pp. 821-824.

S. Wang et al., "Micro-differential scanning calorimeter for liquid biological samples," Review of Scientific Instruments, vol. 87, No. 10, p. 105005, Oct. 2016, doi: 10.1063/1.4965443.

B. Davaji, H. J. Bak, W. J. Chang, and C. H. Lee, "A novel on-chip three-dimensional micromachined calorimeter with fully enclosed and suspended thin-film chamber for thermal characterization of liquid samples," Biomicrofluidics, vol. 8, No. 3, p. 034101, May 2014, doi: 10.1063/1.4875656.

S. Yu et al., "A High-Throughput MEMS-Based Differential Scanning Calorimeter for Direct Thermal Characterization of Antibodies," Biosensors (Basel), vol. 12, No. 6, p. 422, Jun. 2022, doi: 10.3390/BIOS12060422/S1.

J. J. Segovia, D. Vega-Maza, C. R. Chamorro, and M. C. Martin, "High-pressure isobaric heat capacities using a new flow calorimeter," J Supercrit Fluids, vol. 46, No. 3, pp. 258-264, Oct. 2008, doi: 10.1016/J.SUPFLU.2008.01.011.

L. G. Hoxton and R. A. Weiss, "New Method of Flow Calorimetry," Review of Scientific Instruments, vol. 26, No. 11, p. 1058, Nov. 1955, doi: 10.1063/1.1715186.

Hinz, H. J. & Schwarz, F. P. Measurement and analysis of results obtained on biological substances with differential scanning calorimetry. Pure and Applied Chemistry 73, 745-759 (2001).

Hnědkovský, L., Hynek, V., Majer, V. & Wood, R. H. A new version of differential flow heat capacity calorimeter; tests of heat loss corrections and heat capacities of aqueous NaCl from T=300 K to T=623 K. Journal of Chemical Thermodynamics 34, 755-782 (2002).

Schroder, et al., "Design and test of a new flow calorimeter for online detection of geothermal water heat capacity", Geothermics, vol. 53 (2015), pp. 202-212 [doi: http://dx.doi.org/10.1016/j.geothermics.2014.06.001].

S. Ni, H. Zhu, p. Neuzil, and L. Yobas, "A SiN Microcalorimeter and a Non-Contact Precision Method of Temperature Calibration," Journal of Microelectromechanical Systems, vol. 29, No. 5, pp. 1103-1105, Oct. 2020, doi: 10.1109/JMEMS.2020.3008867.

* cited by examiner

620

600

Measured and literature values of the specific heat capacity of selected fluids at 35 °C.

| | Compound | Purity (%) | Chemical formula | Measured $C_p$ ($J\,Kg^{-1}K^{-1}$) | ± std (%) | Literature $C_p$ ($J\,Kg^{-1}K^{-1}$) | Error (%) |
|---|---|---|---|---|---|---|---|
| | Liquid | | | | | | |
| 1 | 1-Propanol | > 99.5 | $C_3H_8O$ | 2443.7 | 0.9 | 2497.7 | −1.0 |
| 2 | Acetone | > 99.5 | $C_3H_6O$ | 2224.6 | 1.6 | 2206.6 | 0.8 |
| 3 | 1-Butanol | > 99.4 | $C_4H_{10}O$ | 2491.8 | 2.1 | 2490.8 | 0.0 |
| 4 | Butyl acetate | > 99.5 | $C_6H_{12}O_2$ | 1966.3 | 1.3 | 1948.9 | 0.9 |
| 5 | Ethanol | > 99.5 | $C_2H_6O$ | 2529.6 | 3.1 | 2526.3 | 0.1 |
| 6 | Formamide | > 99.0 | $CH_3NO$ | 2349.2 | 2.7 | 2413.9 | −2.7 |
| 7 | Glycerol | > 99.5 | $C_3H_8O_3$ | 2392.2 | 2.9 | 2438.4 | −1.9 |
| 8 | Ethylene glycol | > 99.0 | $C_2H_6O_2$ | 2414.4 | 1.3 | 2458.2 | −1.8 |
| 9 | Propylene glycol | > 99.5 | $C_3H_8O_2$ | 2576.3 | 2.7 | 2566.1 | 0.4 |
| 10 | Hexane | > 98.5 | $C_6H_{14}$ | 2258.3 | 3.1 | 2302.7 | −1.9 |
| 11 | Heptane | > 99.5 | $C_7H_{16}$ | 2226.1 | 1.6 | 2282.7 | −0.3 |
| 12 | Octane | > 99.0 | $C_8H_{18}$ | 2218.6 | 1.4 | 2261.9 | −1.9 |
| 13 | n-Decane | > 99.0 | $C_{10}H_{22}$ | 2254.4 | 0.3 | 2246.1 | 0.4 |
| 14 | Undecane | > 99.0 | $C_{11}H_{24}$ | 2207.8 | 3.1 | 2242.9 | −1.6 |
| 15 | Dodecane | > 99.0 | $C_{12}H_{26}$ | 2262.7 | 0.1 | 2236.4 | 1.2 |
| 16 | Hexadecane | > 99.0 | $C_{16}H_{34}$ | 2268.1 | 1.3 | 2238.3 | 1.3 |
| 17 | Dimethyl sulfoxide | > 99.9 | $C_2H_6OS$ | 1970.7 | 1.9 | 1981.3 | −0.5 |
| 18 | Diethylamine | > 99.5 | $C_4H_{11}N$ | 2440.8 | 1.1 | 2410.0 | 1.8 |
| 19 | Triethylamine | > 99.5 | $C_6H_{15}N$ | 2235.8 | 0.2 | 2222.7 | 0.6 |
| 20 | KCl (aq) 4.078 % (w/v) | > 99.5 | | 3887.2 | 1.4 | 3868 | 0.5 |
| 21 | Acetic acid | > 99.5 | $CH_3COOH$ | 2072.8 | 1.4 | 2083.3 | −0.5 |
| 22 | Water | De-ionized | $H_2O$ | 4189.6 | 0.1 | 4178.2 | 0.3 |
| 23 | Polysorbate 80 | > 99.5 | $C_{64}H_{124}O_{26}$ | 2282.1 | 1.7 | n/a | n/a |
| 24 | Triethoxyphenylsilane | > 99.0 | $C_{12}H_{20}O_3Si$ | 1723.4 | 2.5 | n/a | n/a |
| | Gas | | | | | | |
| 25 | Nitrogen | > 99.9 | $N_2$ | 1070.4 | 1.2 | 1039.0 | 3.0 |
| 26 | Air | n/a | $N_2$ and $O_2$ | 994.6 | 2.0 | 1098.4 | −1.1 |
| 27 | Carbon dioxide | > 99.9 | $CO_2$ | 864.2 | 0.3 | 850.0 | 1.7 |

FIG. 12

CONTINUOUS FLOW CALORIMETER SYSTEMS AND RELATED METHODS

CROSS-REFERENCE TO RELATED APPLICATION(S)

This application claims the benefit of U.S. Provisional Patent Application No. 63/444,650 filed Feb. 10, 2023, which is hereby incorporated herein by reference in its entirety.

FIELD

The present disclosure relates generally to calorimetry, and more specifically, to continuous flow calorimeter systems and related methods for determining specific heat capacity of fluids.

BACKGROUND

U.S. Pat. No. 3,834,873 (Picker) discloses differential detection in which a reference cell is used for comparison purposes with an observation cell in which a phenomenon takes place. Detection is obtained by means of a single thermo-electric sensor. The sensor is mounted to a common conduit of heat exchange liquid flow circuit which uses two branch circuits, one associated with each cell. A flow chopping element at the inlet ends of the branch circuits provides complementary periodic flow heat exchange liquid segments in the branch circuits. These segments are then fed into a common return circuit where the sensor is installed.

U.S. Pat. No. 10,175,123 (Lin et al.) discloses a MEMS-based calorimeter including two microchambers supported in a thin film substrate formed on a polymeric layer. The thin film substrate includes a thermoelectric sensor configured to measure temperature differential between the two microchambers, and also includes a thermally stable and high strength polymeric diaphragm.

SUMMARY

The following summary is intended to introduce the reader to various aspects of the applicant's teaching, but not to define any invention.

According to some aspects, a method for determining specific heat capacity of fluids includes: (a) injecting a reference fluid having a known specific heat capacity into at least one channel extending along a reference substrate and a sample fluid having an unknown specific heat capacity into at least one channel extending along a sample substrate; (b) establishing a temperature gradient along the at least one channel of each substrate; (c) measuring temperature differential between a reference location along the temperature gradient of the reference substrate and a corresponding sample location along the temperature gradient of the sample substrate. The temperature differential is measured for a stagnant condition in which the reference and sample fluids are stagnant in respective channels to define a baseline temperature differential, and for each of a plurality of flowrate ratios. Each flowrate ratio is defined by a different sample flowrate at which the sample fluid flows through the at least one channel of the sample substrate relative to a constant reference flowrate at which the reference fluid flows through the at least one channel of the reference substrate. The method further includes (d), based on the measuring in (c), determining a thermally-balanced flowrate ratio of the sample flowrate relative to the reference flowrate at which the temperature differential corresponds to the baseline temperature differential, and evaluating the unknown specific heat capacity based on the thermally-balanced flowrate ratio.

In some examples, each substrate comprises a respective microfluidic chip and the at least one channel comprises at least one microfluidic channel in the chip.

In some examples, each substrate comprises one or more conduits (e.g. in the form of tubing) through which respective channel(s) extend.

In some examples, the measuring in (c) includes receiving voltage signals representative of the temperature differential from at least one differential thermocouple comprising at least one reference junction at the reference location and at least one sample junction at the sample location.

In some examples, step (b) includes maintaining a heated section of each substrate at a first temperature and maintaining a cooled section of each substrate at a second temperature that is less than the first temperature to establish the temperature gradient between the heated and cooled sections. In some examples, the heated section is maintained at the first temperature by a thermoelectric heater and the cooled section is maintained at the second temperature by a thermoelectric cooler.

In some examples, each of the reference location and the sample location is at a common location along the temperature gradient of a respective substrate.

In some examples, the method includes determining a functional relation between the plurality of flowrate ratios and corresponding temperature differentials measured in (c), and the determining in (d) includes evaluating the thermally-balanced flowrate ratio based on the functional relation.

According to some aspects, a method for determining specific heat capacity of fluids includes: (a) injecting a reference fluid into at least one reference channel and a sample fluid into at least one sample channel; (b) establishing a temperature gradient along the at least one reference channel and along the at least one sample channel; (c) measuring temperature differential between the at least one reference channel and the at least one sample channel, including for a plurality of flowrate ratios, each flowrate ratio defined by a reference flowrate of the reference fluid and a sample flowrate of the sample fluid; and (d) based on the measuring in (c), determining a thermally-balanced flowrate ratio of the sample flowrate relative to the reference flowrate at which a strength of both the reference and sample fluids in changing the temperature gradient along respective channels becomes generally equal, and evaluating the unknown specific heat capacity based on the thermally-balanced flowrate ratio.

According to some aspects, a continuous flow calorimeter device for determining specific heat capacity of fluids includes: (a) a plurality of substrates including a reference substrate and at least one sample substrate, each substrate having at least one channel extending along the substrate between an inlet and an outlet; (b) a heat transfer system coupled to the plurality of substrates and operable to establish a temperature gradient along the at least one channel of each substrate; (c) a pump system operable to pump a reference fluid having a known specific heat capacity through the at least one channel of the reference substrate and a sample fluid having an unknown specific heat capacity through the at least one channel of the sample substrate at a plurality of flowrate ratios, each flowrate ratio defined by a different sample flowrate at which the sample fluid is pumped relative to a constant reference flowrate at which the reference fluid is pumped; and (d) a temperature-differential sensor system including at least one thermoelectric sensor having at least one reference sensor element positioned at a reference location along the temperature gradient of the reference substrate and at least one sample sensor element positioned at a corresponding sample location along the temperature gradient of the sample substrate. The temperature sensor system is operable to measure temperature differential between the reference and sample locations for a stagnant condition in which the reference and sample fluids are stagnant in respective channels to define a baseline temperature differential, and for each of the plurality of flowrate ratios to determine a thermally-balanced flowrate ratio at which the temperature differential corresponds to the baseline temperature differential. The thermally-balanced flowrate ratio is used for evaluating the unknown specific heat capacity.

In some examples, each substrate comprises a respective microfluidic chip, and the at least one channel comprises at least one microfluidic channel in the chip.

In some examples, each microfluidic chip comprises a silicon base layer in which the at least one microfluidic channel is formed and along which the temperature gradient is established.

In some examples, each microfluidic chip has a recess extending laterally inwardly toward a respective microfluidic channel for receiving a respective sensor element in close proximity to the microfluidic channel.

In some examples, the plurality of substrates are generally identical and interchangeable.

In some examples, the at least one channel comprises a plurality of channels extending generally parallel with each other along the substrate between the inlet and the outlet.

In some examples, the heat transfer system includes a heating module for maintaining a heated section of each substrate at a first temperature and a cooling module for maintaining a cooled section of each substrate at a second temperature that is lower than the first temperature to establish the temperature gradient along an intermediate section of the substrate between the heated and cooled sections.

In some examples, the heating module comprises one or more thermoelectric heaters, and the cooling module comprises one or more thermoelectric coolers.

In some examples, the at least one thermoelectric sensor comprises at least one differential thermocouple for generating voltage signals representative of the temperature differential. The at least one thermocouple has at least one first junction defining the at least one reference sensor element and at least one second junction defining the at least one sample sensor element.

In some examples, each of the reference location and the sample location is at a midpoint along the temperature gradient of a respective substrate.

In some examples, the pump system includes a reference fluid pump for pumping the reference fluid at the constant reference flowrate and at least one sample fluid pump for pumping the sample fluid at the different sample flowrates.

In some examples, the at least one sample fluid pump comprises a plurality of fluid pumps for pumping respective fluids and the pump system further includes a mixer for mixing the respective fluids when being pumped to produce the sample fluid.

According to some aspects, a continuous flow calorimeter system for determining specific heat capacity of fluids includes the device as specified above and a control system having at least one processor configured to control operation of the device to perform the method as specified above.

BRIEF DESCRIPTION OF THE DRAWINGS

The drawings included herewith are for illustrating various examples of devices, systems, and methods of the present specification and are not intended to limit the scope of what is taught in any way. In the drawings:

FIG. 12 is a table showing experimental measurements of specific heat capacity ("Measured $C_p$") for selected fluids at 35° C. obtained using a system like that shown in FIG. 2, compared to accepted literature values ("Literature $C_p$") for the selected fluids.

DETAILED DESCRIPTION

Figure 1:
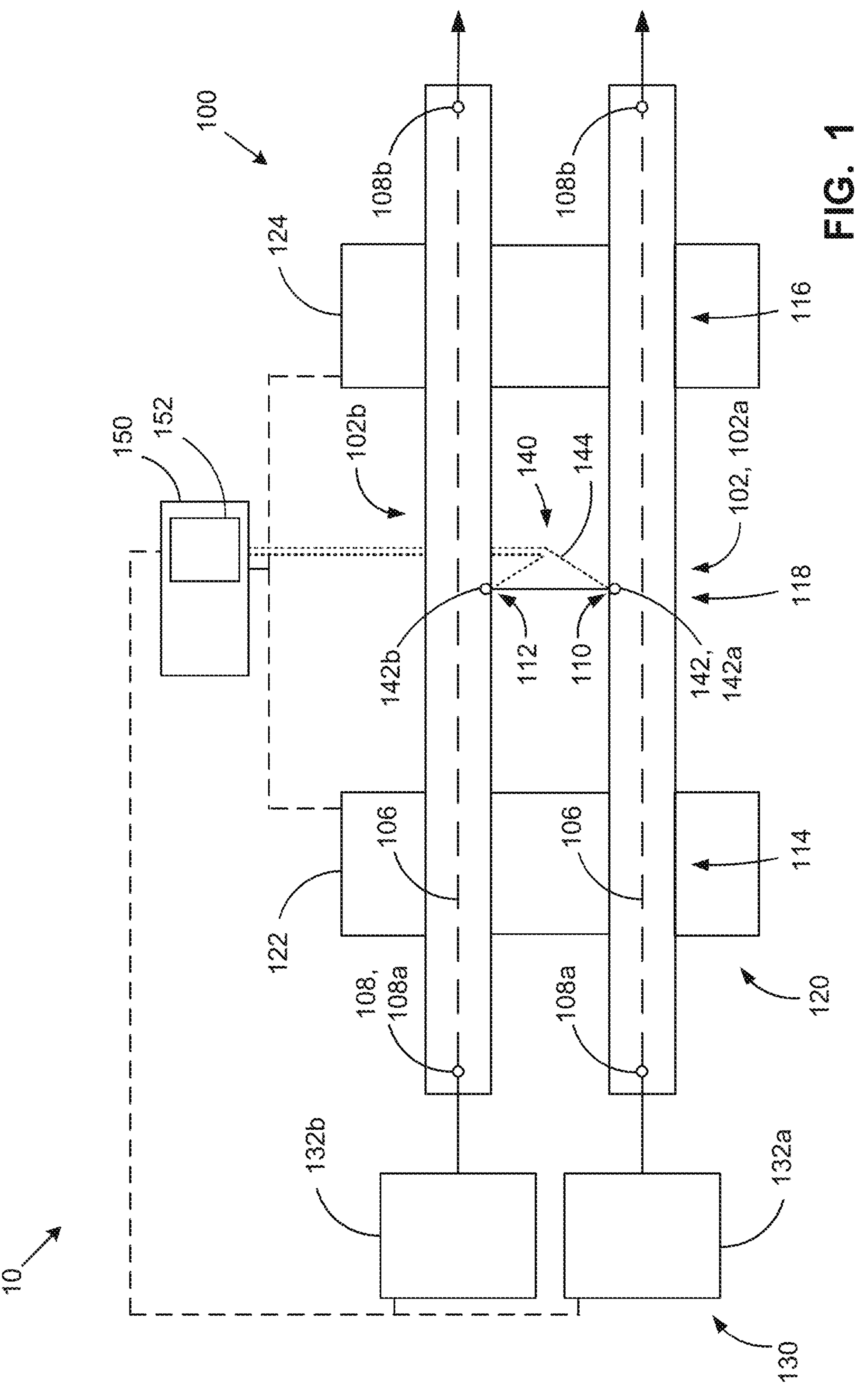
FIG. 1 is a schematic top view of an example continuous flow calorimeter system.

Various devices, systems, or methods will be described below to provide an example of an embodiment of each claimed invention. No embodiment described below limits any claimed invention and any claimed invention may cover devices, systems, or methods that differ from those described below. The claimed inventions are not limited to devices, systems, or methods having all of the features of any one device, system, or method described below or to features common to multiple or all of the devices, systems, or methods described below. It is possible that a device, system, or method described below is not an embodiment of any claimed invention. Any invention disclosed in a device, system, or method described herein that is not claimed in this document may be the subject matter of another protective instrument, for example, a continuing patent application, and the applicants, inventors, or owners do not intend to abandon, disclaim, or dedicate to the public any such invention by its disclosure in this document.

Specific heat capacity is a key property in the analysis and selection of advanced energy materials. Measurement of specific heat capacity can be challenging, requiring careful experimentation and data analysis, as well as accurate instrumentation. A common method for determining specific heat capacity for sample fluids is through the use of calorimeters.

Some calorimeter designs, such as differential scanning calorimeters, operate in batch mode and require significant time (e.g., hours) to perform measurements, as well as several manual steps for calibration, sample loading and unloading, and cleaning. This can make such calorimeter designs unsuitable for high-throughput measurements. The measurements from such designs can also be inconsistent in some cases.

Calorimeter designs utilizing microfluidics can offer certain advantages relative to larger-scale designs, including faster response time, lower sample consumption, decreased thermal lag (e.g., through a high surface-to-volume ratio), and higher resolution measurements. However, having a high surface-to-volume ratio can also increase heat exchange with surroundings. This can be particularly problematic in calorimeter designs that require heat flux measurements to determine heat absorption by the sample fluid, as it can be difficult to precisely determine the portion of heat flux absorbed by the fluid relative to that lost to the environment or other system components.

Some calorimeter designs utilize rigid environmental controls to reduce heat loss, such as through the use of vacuum chambers. However, this often requires cumbersome equipment and increases system complexity, and can still fail to address heat loss through conduction and/or radiation. Some calorimeter designs compensate for heat loss with measurement corrections. Use of such corrections, however, often requires that the heat loss is repeatable, which can be difficult to control. Furthermore, some calorimeter designs that rely on heat flux measurements may be limited to determining specific heat capacity for sample fluids having physical properties similar to that of known reference fluids.

In some aspects, the present disclosure provides solutions that may address some of the shortcomings in existing calorimeter designs. According to some aspects, continuous flow calorimeter systems for determining the specific heat capacity of fluids (e.g., liquids or gases) are disclosed. In some examples, the calorimeter systems of the present disclosure may provide increased throughput, accuracy, and/or repeatability relative to some existing calorimeter designs, and may do so without necessarily requiring heat flux measurements, rigid environmental controls, and/or the sample fluid having physical properties similar to those of a reference fluid. The calorimeter systems of the present disclosure may also be operable to characterize specific heat capacity faster (e.g., in less than one minute in some cases) than some existing calorimeter designs while providing a competitive accuracy (e.g., less than 1% in some cases), and may be operable at a wider range of temperatures and/or pressures relative to some existing calorimeter designs. The systems and methods of the present disclosure can in some examples operate at high pressure relative to some existing systems, and so may be suitable for determining specific heat capacity of volatile fluids and gases. The calorimeter systems and methods of the present disclosure are also scale independent, and can be adapted to work at smaller and larger scales than those disclosed herein.

According to some aspects, the calorimeter systems of the present disclosure rely on temperature measurement, and in some examples, do not necessarily require quantification of heat flux gained by fluids. The calorimeter systems are based on the concept of energy transfer by a sample fluid having an unknown specific heat capacity relative to that of a reference fluid having a known specific heat capacity. An example calorimeter system of the present disclosure includes a plurality of substrates (e.g., in the form of microfluidic chips, conduits (e.g. tubing), manifold assemblies, or other solid media through which fluid channels can extend) including a reference substrate and at least one sample substrate. Each substrate has at least one channel (e.g., microfluidic channel) extending along the substrate between an inlet and an outlet. In some examples, the substrates can be identical and interchangeable.

A heat transfer system (e.g., including thermoelectric heat pumps) can be used to establish the same temperature gradient along the channel(s) of each substrate. The reference fluid can be injected into and pumped through the channel(s) of the reference substrate, and the sample fluid can be injected into and pumped through the channel(s) of the sample substrate. The reference and sample fluids can be pumped at a plurality of different flowrate ratios. Each flowrate ratio can be defined by a different sample flowrate at which the sample fluid is pumped relative to a constant reference flowrate at which the reference fluid is pumped.

A temperature-differential sensor system (e.g., comprising at least one thermoelectric temperature sensor) can be used to measure temperature differential (e.g., as a voltage signal) between a reference location along the temperature gradient of the reference substrate and a corresponding sample location along the temperature gradient of the sample substrate. The reference and sample locations can correspond to the same axial position (e.g., midpoint) along the temperature gradient of each substrate. The temperature differential can be measured for a stagnant condition in which the reference and sample fluids are stagnant in respective channels to define a baseline temperature differential, which can facilitate calibration of the system and compensate for confounding variables (e.g., the thermal conductivity of the fluids and/or deviations from symmetry). The temperature differential can also be measured for each of the plurality of different flowrate ratios. The temperature differential measurements can then be used to determine a thermally-balanced flowrate ratio at which the temperature differential corresponds to the baseline temperature differential.

The thermally-balanced flowrate ratio can then be used to evaluate the unknown specific heat capacity of the sample fluid. For example, when the reference fluid is pumped along the temperature gradient of the reference substrate from hot to cold, the reference fluid transfers energy from hot to cold depending on the volumetric flowrate ($Q_r$), density ($\rho_r$), and specific heat capacity ($C_{pr}$). This can cause a deviation of the temperature gradient on the reference substrate ($\delta T_r \propto \rho_r Q_r C_{pr}$) relative to the stagnant condition. Knowing the density of the sample fluid ($\rho_s$) and adjusting its volumetric flowrate ($Q_s$) along the temperature gradient of the sample substrate to recover the same temperature deviation ($\delta T_s = \delta T_r$) for the temperature gradient on the sample substrate, the specific heat capacity of the sample fluid ($C_{ps}$) can be determined through $C_{ps} = C_{pr}(\rho_r/\rho_s)(Q_r/Q_s)$, where $Q_r/Q_s$ is the thermally-balanced flowrate ratio. This allows for the determination of specific heat capacity independent of heat flux measurement, and can facilitate high-accuracy, high-throughput calorimetry in a continuous manner.

Referring to FIG. 1, an example continuous flow calorimeter system 10 for determining specific heat capacity of fluids is shown schematically. The system 10 comprises a calorimeter device 100 having a plurality of substrates 102, including a reference substrate 102*a* (which can also be referred to as reference medium 102*a*) and at least one sample substrate 102*b* (which can also be referred to as sample medium 102*b*). In the example illustrated, the device 100 includes a pair of the substrates 102, including one reference substrate 102*a* and one sample substrate 102*b*. Each substrate 102 has at least one channel 106 extending along the substrate between a pair of ports 108. In the example illustrated, each channel 106 is formed in and extends through a respective substrate. The pair of ports 108 includes a first port 108*a* and a second port 108*b*. In the example illustrated, the first port 108*a* serves as an inlet for the at least one channel 106, and the second port 108*b* serves as an outlet for the at least one channel 106. The at least one channel 106 of the reference substrate 102*a* is for conducting a reference fluid having a known specific heat capacity. The at least one channel 106 of the sample substrate 102*b* is for conducting a sample fluid having an unknown specific heat capacity.

Figure 2:
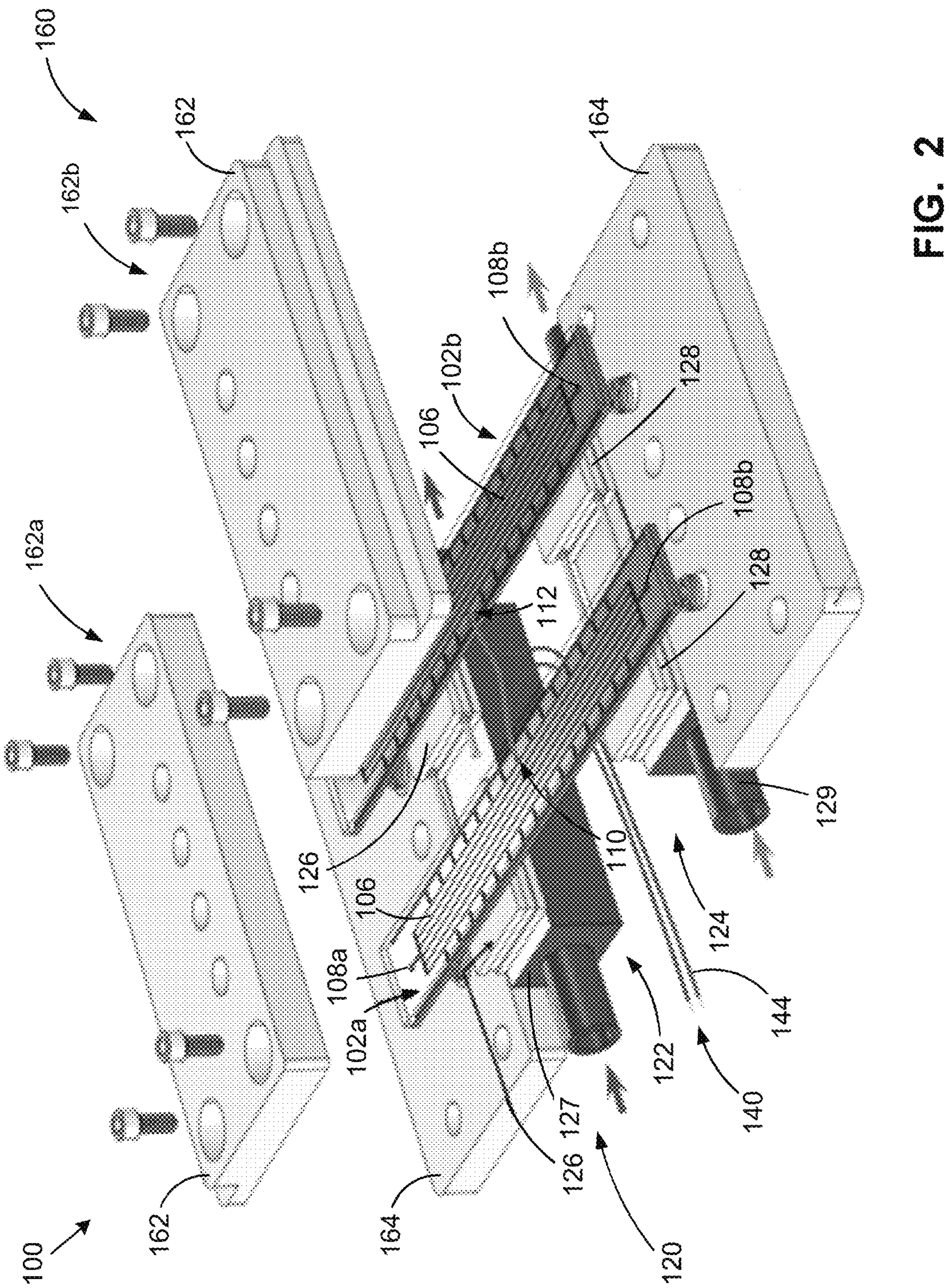
FIG. 2 is a partially exploded perspective view of portions of the calorimeter system of FIG. 1.

Referring to FIG. 2, in the example illustrated, each substrate 102 has a plurality of channels 106 (six in the example illustrated) extending generally parallel with each other between the ports 108*a*, 108*b* (inlet and outlet) for conducting the respective fluid therethrough. In the example illustrated, each substrate 102 is in the form of a microfluidic chip (described in more detail below), and the channels 106 comprise microfluidic channels in the microfluidic chip.

Figure 3:
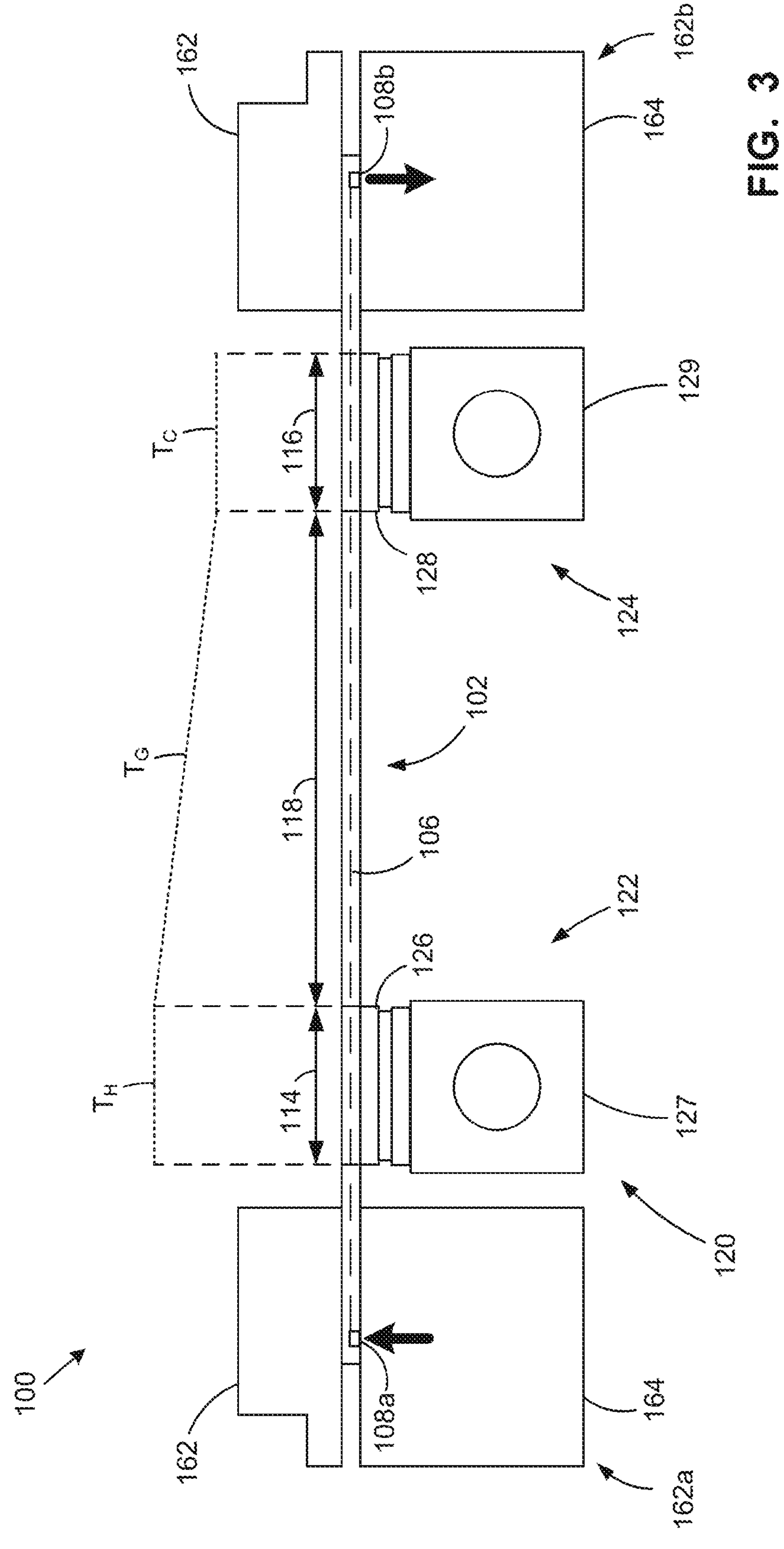
FIG. 3 is a schematic side view of portions of the calorimeter system of FIG. 1.

In the example illustrated, the device 100 further includes a heat transfer system 120 coupled to the reference and sample substrates 102*a*, 102*b*. Referring to FIG. 3, the heat transfer system 120 is operable to establish a temperature gradient $T_G$ along each substrate 102. In the example illustrated, the same temperature gradient $T_G$ is established along each substrate 102, and the temperature gradient $T_G$ extends along the channels 106 of each substrate 102.

In the example illustrated, the heat transfer system 120 includes a heating module 122 coupled to a heated section 114 of each substrate 102 for maintaining the heated sections 114 at a first temperature $T_H$ and a cooling module 124 coupled to a cooled section 116 of each substrate 102 for maintaining the cooled sections 116 at a second temperature $T_C$ that is less than the first temperature $T_H$. The heated and cooled sections 114, 116 of each substrate 102 are spaced apart by an intermediate section 118 of the substrate 102 along which the temperature gradient $T_G$ extends, from the first temperature $T_H$ to the second temperature $T_C$. In the example illustrated, the intermediate section 118 of each substrate has the same axial extent between the heated and cooled sections 114, 116. The temperature gradient $T_G$ is generally linear along the intermediate section 118 from the first temperature $T_H$ at the heated section 114 to the second temperature $T_C$ at the cooled section 116. In the example illustrated, the heated, intermediate, and cooled sections 114, 116, 118 are inboard of the pair of ports 108 (inlet and outlet) of the channel 106, and the channels 106 of each substrate 102 extend through the heated, intermediate, and cooled sections 114, 116, 118 (and along the temperature gradient $T_G$) of the substrate 102.

In the example illustrated, the plurality of substrates 102 are similar in structure, dimensions, and thermal properties, to facilitate the establishment of a similar temperature gradient profile along each substrate 102 (e.g., prior to introducing the fluids therein) for a given first and second temperature $T_H$, $T_C$, and to provide similar flow characteristics for the reference and sample fluids flowing through respective channels along the temperature gradient $T_G$. In the example illustrated, the plurality of substrates 102 (i.e., in the form of microfluidic chips, in the example illustrated) are generally identical and interchangeable.

In the example illustrated, the heating module 122 includes one or more thermoelectric heaters 126 (e.g., Peltier devices) operable to maintain the first temperature $T_H$ by transferring heat from a heat source 127 to the heated sections 114 of the substrates 102. The cooling module 124 includes one or more thermoelectric coolers 128 (e.g., Peltier devices) operable to maintain the second temperature $T_C$ by transferring heat from the cooled sections 116 of the substrates 102 to a heat sink 129.

Referring to FIG. 2, in the example illustrated, the heating module 122 includes a pair of thermoelectric heaters 126, with each heater 126 coupled to the heated section 114 of a respective substrate 102. The cooling module 124 includes a pair of thermoelectric coolers 128, with each cooler 128 coupled to the cooled section 116 of a respective substrate 102. The pair of thermoelectric heaters 126 can be connected in series to maintain the same first temperature $T_H$ at both of the heated sections 114 simultaneously, and the thermoelectric coolers 128 can be connected in series to maintain the same second temperature $T_C$ at both of the cooled sections 116 simultaneously. The thermoelectric heaters and coolers 126, 128 can be connected to one or more power sources, and can be controlled (e.g., through adjustment of power source voltage) to regulate heat transfer from the heat source 127 to the heated sections 114 and from the cooled sections 116 to the heat sink 129 for maintaining the first and second temperatures $T_H$, $T_C$. In the illustrated example, the heat source 127 comprises a relatively hotter water supply flowing through a heat transfer block in thermal contact with a heat input side of the thermoelectric heaters 126. The heat sink 129 comprises a relatively cooler water supply (relative to the hotter water supply) flowing through a heat transfer block in thermal contact with a heat output side of the thermoelectric coolers 128.

Referring to FIG. 1, in the example illustrated, the device 100 comprises a fluid pump system 130 for pumping the reference and sample fluids through the channels 106 of respective reference and sample substrates 102*a*, 102*b*. The pump system 130 is operable to pump the reference fluid and the sample fluid at a plurality of flowrate ratios. Each flowrate ratio is defined by a different sample flowrate at which the sample fluid is pumped relative to a constant reference flowrate at which the reference fluid is pumped.

In the example illustrated, the pump system 130 has a plurality of fluid pumps 132 (e.g., precision analytical pumps) for pumping the reference and sample fluids. The fluid pumps 132 include a reference fluid pump 132*a* for pumping the reference fluid (e.g., at the constant reference flowrate) and at least one sample fluid pump 132*b* for pumping the sample fluid (e.g., at the different sample flowrates). In the example illustrated, the reference fluid pump 132*a* is in fluid communication with the first port 108*a* of the reference substrate 102*a* for pumping the reference fluid into the first port 108*a*, through the channels 106, and out from the second port 108*b* of the reference substrate 102*a*. The sample fluid pump 132*b* is in fluid communication with the first port 108*a* of the sample substrate 102*b* for pumping the sample fluid into the first port 108*a*, through the channels 106, and out from the second port 108*b* of the sample substrate 102*b*. The second ports 108*b* can be in fluid communication with, for example, respective reference and sample fluid reservoirs of the pump system 130 for receiving fluids discharged from the ports 108*b* and from which the pump system 130 can draw the fluids.

The pumps 132 are optionally reversible in operation to enable pumping the fluids in either direction along the temperature gradient $T_G$ (e.g., from hot to cold, in which case the fluids flow from the first port 108*a* serving as the inlet toward the second port 108*b* serving as the outlet, and from cold to hot, in which case the fluids flow from the second port 108*b* serving as the inlet toward the first port 108*a* serving as the outlet).

The calorimeter device 100 further includes a temperature-differential sensor system 140. The temperature sensor system 140 is operable to measure temperature differential between a reference location 110 along the temperature gradient $T_G$ (and intermediate section 118) of the reference substrate 102*a* and a corresponding sample location 112 along the temperature gradient $T_G$ (and intermediate section 118) of the sample substrate 102*b*. In the example illustrated, the reference location 110 and the sample location 112 are at a common axial position along the temperature gradient $T_G$ (and intermediate section 118) of respective substrates 102*a*, 102*b*. The reference location 110 is spaced apart from the heated section 114 of the reference substrate 102*a* by a first axial distance and from the cooled section 116 of the reference substrate 102*a* by a second axial distance. The sample location 112 is spaced apart from the heated section 114 of the sample substrate 102*b* by the same first axial distance and from the cooled section 116 of the sample substrate 102*b* by the same second axial distance. In the example illustrated, the reference and sample locations 110, 112 are located at a midpoint along the temperature gradient $T_G$ (and intermediate section 118) of respective substrates 102.

In the example illustrated, the temperature-differential sensor system 140 includes at least one thermoelectric sensor having a plurality of sensor elements 142, including at least one reference sensor element 142*a* positioned at the reference location 110 and at least one sample sensor element 142*b* positioned at the corresponding sample location 112 for measuring the temperature differential. In the illustrated example, the thermoelectric sensor comprises a differential thermocouple 144 (e.g., a differential K-type thermocouple) for generating voltage signals representative of the temperature differential. The thermocouple 144 has at least one first junction defining the at least one reference sensor element 142*a* and at least one second junction defining the at least one sample sensor element 142*b*. In the example illustrated, the temperature differential is measured directly (i.e. by generating voltage signals representative of the temperature differential), and so no constant temperature reference junction is required.

In some examples, the temperature differential may be measured indirectly, for example, by measuring the temperature at each of the reference and sample locations (e.g., by receiving voltage signals representative of the temperature at the reference location and the temperature at the sample location), and determining the temperature differential based on a difference in the temperature measurements.

In some examples, the at least one thermoelectric sensor can comprise a plurality of thermocouples in the form of a thermopile, which may provide voltage signals of larger magnitude and facilitate more accurate measurement.

In the example illustrated, the temperature-differential sensor system 140 is operable to measure the temperature differential for a stagnant condition, in which the reference and sample fluids are stagnant in respective channels to define a baseline temperature differential. The temperature-differential sensor system 140 is further operable to measure the temperature differential for each of the plurality of different flowrate ratios at which the reference and sample fluids are pumped to determine a thermally-balanced flowrate ratio. The thermally-balanced flowrate ratio corresponds to the flowrate ratio (of the sample flowrate relative to the constant reference flowrate) at which the temperature differential corresponds to the baseline temperature differential. The thermally-balanced flowrate ratio can then be used for evaluating the unknown specific heat capacity of the sample fluid (e.g., through $C_{ps}=C_{pr}(\rho_r/\rho_s)(Q_r/Q_s)$ as outlined above, where the product of density and volumetric flowrate for each fluid shows the mass flowrate). The relevant fluid densities can be evaluated at the condition where the flowrates are measured. For example, in some examples, the volumetric flowrates can be measured from the displacement of the fluids by a syringe plunger of the pump system, and the densities in the above-noted equation can be those at the temperature and pressure of the fluid inside the syringes. If the flowrates are measured at a different point, such as at the substrate inlet, outlet, or midway along respective channels, then the densities can be evaluated at the condition of the flowmeter at that location. This can be important for cases where the fluid is compressible, such as where the fluid being analyzed is a gas. In general, the product of the density and volumetric flowrate of the fluid corresponds to the mass flowrate, which is constant during steady state measurements.

Figures 4A, 4B, 4C, 4D:
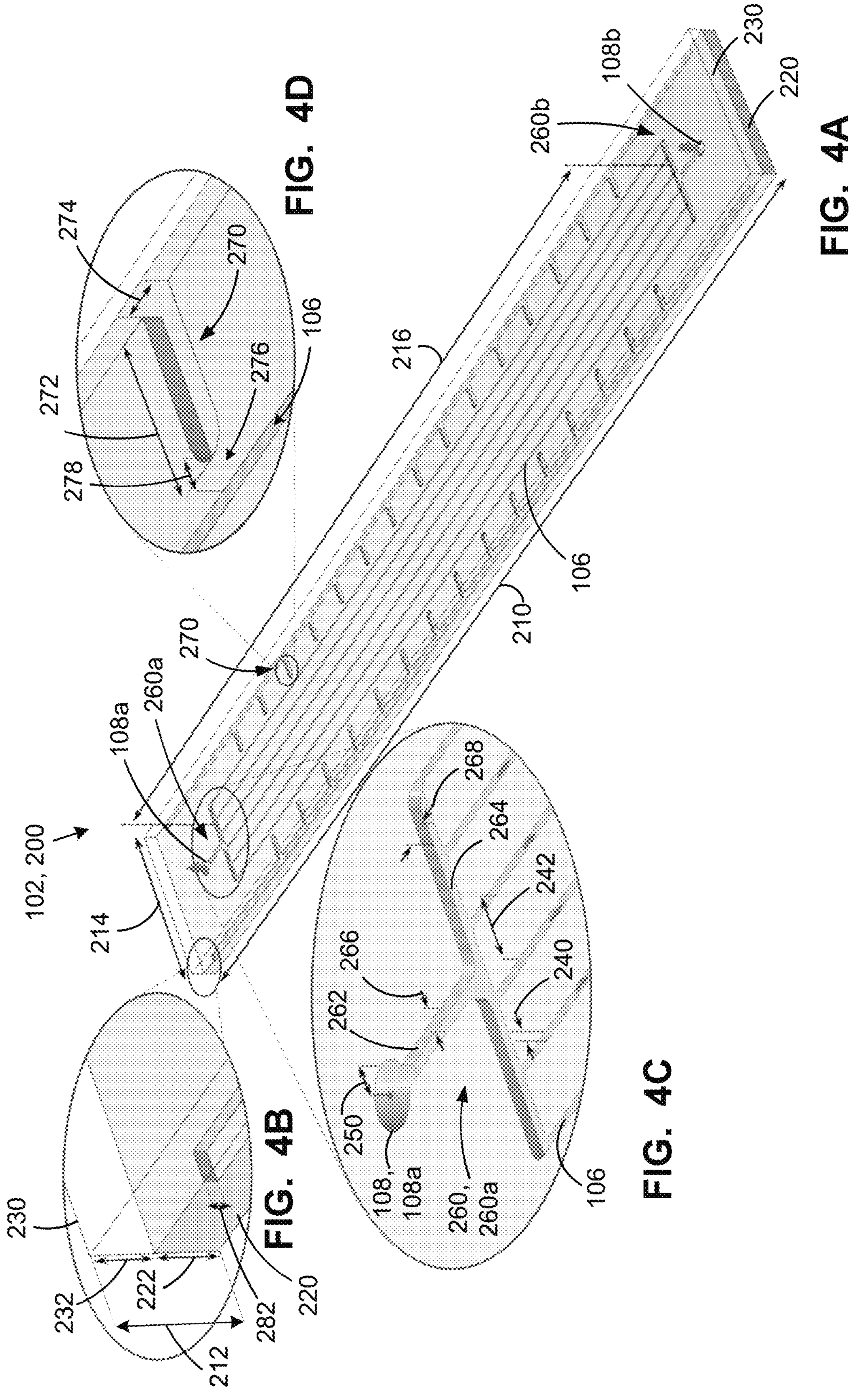
FIG. 4A is an enlarged perspective view of a channel substrate of the system of FIG. 1.
FIG. 4B is a close-up view of a portion of the substrate of FIG. 4A.
FIG. 4C is a close-up view of another portion of the substrate of FIG. 4A.
FIG. 4D is a close-up view of another portion of the substrate of FIG. 4A.
Figure 6C:
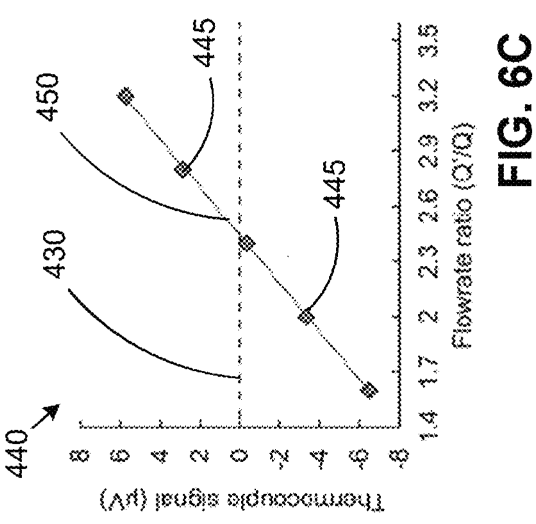
FIG. 6C is a graph showing averaged thermocouple signals for each of the plurality of flowrate ratios of FIG. 6B.
Figure 6B:
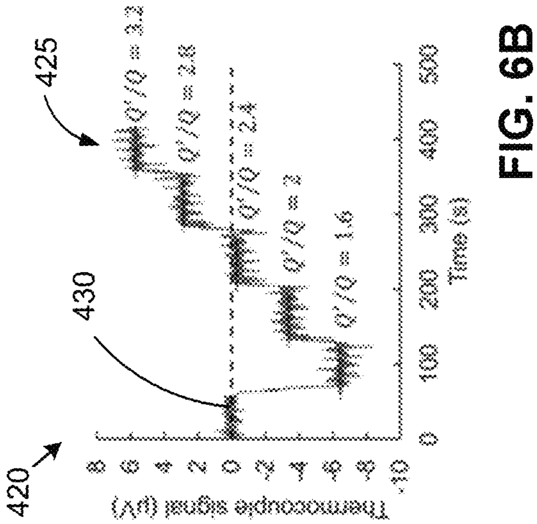
FIG. 6B is a graph showing calibrated thermocouple signals recorded for a baseline stagnant condition and a plurality of different flowrate ratios over respective time periods using a calorimeter system like that of FIG. 1.
Figure 6A:
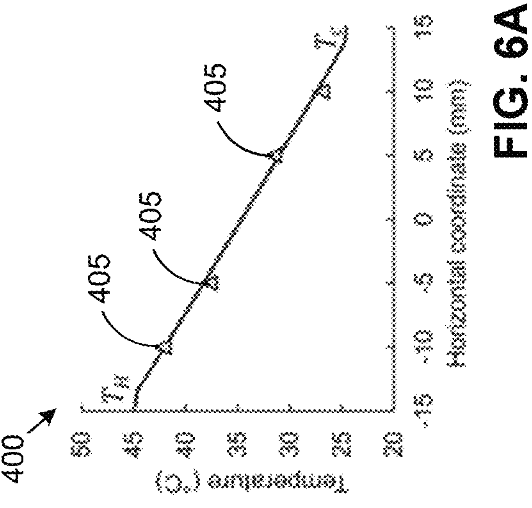
FIG. 6A is a graph showing a linear temperature gradient profile established along a substrate like that of FIG. 4A.

Referring to FIG. 4A, an enlarged view of the substrate 102 is provided. In the example illustrated, the substrate 102 is in the form of a microfluidic chip 200. In the example illustrated, the microfluidic chip 200 has a base layer 220. The channels 106 are formed (e.g., etched) in the topside of the base layer 220, and the heaters and coolers 126, 128 are in thermal contact with an underside of the base layer 220 to establish the temperature gradient $T_G$ along the channels 106. In the example illustrated, the base layer 220 is formed of silicon. The thermal conductivity properties of the silicon base layer 220 can facilitate a relatively fast thermal response to input from the heat transfer system 120 and change in fluid flowrates, and with establishing a generally linear temperature gradient along the intermediate section 118 of the substrates 102 (see e.g., FIG. 6A, showing example temperature measurements 405 along the temperature gradient established on a microfluidic chip like the chip 200). Use of the silicon chip 200 may also allow for sampling at relatively high pressures and/or temperatures (e.g., up to 100 MPa and/or up to 800° C.). Other materials with suitably high thermal conductivity can also be used for fabrication of the substrate through which the channels extend.

Referring to FIG. 4A, the microfluidic chip 200 has a cover layer 230 covering the topside of the silicon base layer 220 to enclose the microfluidic channels 106 from above. In the example illustrated, the cover layer 230 is generally transparent to allow for visibility of the microfluidic channels 106. The cover layer 230 may be formed of glass (e.g., borosilicate glass) or other material having suitable transparency to view the channels 106, which can facilitate visual confirmation of proper operation and flow through the channels 106, and identification of potential blockages.

In the example illustrated, the microfluidic chip 200 extends along a substrate axis, and has a chip length 210 along the axis, a chip width 214 transverse to the length 210, and a chip thickness 212 (FIG. 4B) between the topside and underside surfaces.

In the example illustrated, the channels 106 comprise microfluidic channels extending along the substrate axis. In the example illustrated, the chip 200 includes a plurality of the microfluidic channels 106 extending parallel with each other along the length 210 of the chip 200 between the ports 108*a*, 108*b*. The configuration of the microfluidic channels (e.g., quantity of channels, dimensions, and spacing) can be selected to produce a measurable deviation in the temperature gradient $T_G$ during flow of the fluids through respective channels 106 relative to the stagnant condition. The channel configuration can also be based on a desired range of volumetric flowrates through the channels 106. The volumetric flowrate can vary depending on a number of factors. During experimentation with a system like the example shown in FIG. 2, a typical range used for the volumetric flowrate was 0.01-1 mL/min. Volumetric flowrates outside of this range may also be used depending on the specific configuration of the system. For example, a lower volumetric flowrate could be used if the device is scaled down (e.g. the chip and channel size is reduced) and/or if a more sensitive differential thermometer is used (e.g. in place of a double junction differential thermocouple, such as a thermopile that has several junctions on the reference channel side and several junctions on the sample channel side).

Referring to FIG. 4C, in the example illustrated, the microfluidic chip 200 has six microfluidic channels 106. In the example illustrated, the microfluidic channels 106 are spaced laterally and equally apart from each other by a channel spacing 242. In the example illustrated, the spacing 242 is about 1.15 mm. Each channel 106 has a cross-sectional area that is generally constant along a channel length 216 (FIG. 4A) of the channel 106. In the example illustrated, the cross-sectional area is generally rectangular in shape and defined by a channel width 240 and a channel height. The cross-sectional area can be shaped differently in other examples (e.g., circular, semi-circular, oval, square, etc.) depending on the desired channel configuration, flow characteristics, manufacturing capabilities, etc.

In the example illustrated, each of the channel width 240 and height can be on the microscale. In the example illustrated, the channel width 240 is about 0.15 mm. Referring to FIG. 4B, in the example illustrated, the channel height corresponds to an etching depth 282 in the silicon base layer 220. In the example illustrated, the etching depth 282 is about 0.2 mm. Referring to FIG. 4A, in the example illustrated, each microfluidic channel 106 extends along most of the length 210 of the microfluidic chip 200. In the example illustrated, each channel 106 has a channel length 216 of about 75 mm.

Referring to FIG. 4C, in the example illustrated, each microfluidic channel 106 extends between a first end adjacent to the first port 108*a* and a second end axially opposite the first end and adjacent to the second port 108*b*. Each port 108 is in fluid communication with the adjacent ends of the channels 106 through a respective header 260. Referring to FIG. 4A, in the example illustrated, each chip 200 has a first header 260*a* providing fluid communication between the first port 108*a* and the first ends of the microfluidic channels 106 (e.g., for distributing fluid pumped through the first port 108*a* among the channels 106), and a second header 260*b* providing fluid communication between the second ends of the microfluidic channels 106 and the second port 108*b* (e.g., for collecting fluid from the channels 106 for evacuation through the second port 108*b*). In the example illustrated, each chip 200 is generally symmetrical with the first port 108*a* and first header 260*a* being generally identical to the second port 108*b* and second header 260*b*, respectively.

Referring to FIG. 4C, each header 260 has a header first portion 262 extending axially and providing fluid communication between a respective port 108 and a header second portion 264 extending laterally and open to each microfluidic channel 106. Each port 108 extends vertically through the silicon base layer 220 and is defined by a radius 250. In the example illustrated, the radius 250 is about 0.55 mm. Each header first portion 262 has a width 266. In the example illustrated, the width 266 of the header first portion is about 0.4 mm. Each header second portion 264 has a width 268, which is about 0.5 mm in the example illustrated. In the example illustrated, each of the header first and second portions 262, 264 have a height corresponding to the etching depth 282 (FIG. 4B).

Referring to FIG. 4A, the dimensions of the microfluidic chip 200 can be selected to accommodate the desired microfluidic channel configuration and temperature response suitable for the purposes outlined herein. In the example illustrated, the chip length 210 is about 92 mm and the chip width 214 is about 12 mm. Referring to FIG. 4B, in the example illustrated, the chip thickness 212 is about 2 mm (with the silicon base layer 220 having a thickness 222 of about 1 mm and the cover layer having a thickness 232 of about 1 mm).

In the example illustrated, the microfluidic chip 200 has a pair of laterally opposed edges extending along the chip length 210, and at least one recess 270 is formed in the edges and extends laterally inwardly toward an adjacent microfluidic channel 106. In the example illustrated, the chip 200 has a plurality of recesses 270 spaced equally apart from each other along each edge. The recesses 270 along one edge are in alignment along the chip length 210 with the recesses 270 along the opposite edge.

Referring to FIG. 4D, in the example illustrated, each recess 270 is formed (e.g., etched) in the silicon base layer 220, and the reference and sample locations 110, 112 are defined by respective recesses 270. In the example illustrated, the recess 270 at the midpoint of the intermediate section 118 of the reference substrate 102*a* defines the reference location 110, and the recess 270 at the midpoint of the intermediate section 118 of the sample substrate 102*b* defines the sample location 112.

In the example illustrated, the recesses 270 are configured to receive respective sensor elements 142 in close proximity to the microfluidic channels 106. This may, for example, facilitate attachment of the sensor elements to respective substrates 102, and faster and/or more accurate response to flow-induced temperature changes. When positioned in respective recesses, the sensor elements 142 may be within, for example, 5 mm of an adjacent microfluidic channel 106. In the example illustrated, each recess 270 is separated from an adjacent microfluidic channel 106 by a recess endwall 276. The recess endwall 276 can have a wall thickness 278, which is about 0.4 mm (or about 0.37 mm) in the example illustrated. In the example illustrated, the sensor elements

142 are positioned adjacent to the recess endwall 276 and are within about 0.4 mm (or about 0.37 mm) of an adjacent microfluidic channel 106.

Each recess 270 extends along a recess length 272 between the recess endwall 276 and a recess opening opposite the endwall 276 for receiving the sensor element 142. In the example illustrated, the recess length 272 is about 1.5 mm. Each recess 270 has a recess width 274 and height perpendicular to the length 272 and is sized for accommodating the insertion of a respective sensor element. In the example illustrated, the width 274 is about 0.5 mm, and the height corresponds to the etching depth 282 (FIG. 4B).

In some examples, the reference substrate 102*a* can optionally have a plurality of reference locations defined by respective recesses 270 spaced apart from each other along the temperature gradient $T_G$ (and intermediate section 118) of the reference substrate 102*a*. The sample substrate 102*b* can have a plurality of sample locations defined by respective recesses 270 spaced apart from each other along the temperature gradient $T_G$ (and intermediate section 118) of the sample substrate 102*b*. Each reference location can be paired with a corresponding sample location positioned at the same axial position along the temperature gradient to define a plurality of pairs of reference and sample locations. In such examples, the temperature-differential sensor system 140 can be operable to measure temperature differential for each pair of reference and sample locations (e.g., through the use of a plurality of thermocouples, one for each pair), for determining specific heat capacity at different axial locations and temperatures along the temperature gradient.

Referring to FIG. 2, in the example illustrated, the calorimeter device 100 includes an optional support assembly 160 for supporting the plurality of substrates 102 in spaced apart relation from each other (and with the intermediate sections 118 generally thermally isolated from each other). In the example illustrated, the support assembly 160 has a pair of platforms 162, including a first platform 162*a* for supporting a first end of both substrates 102*a*, 102*b* proximate the first ports 108*a*, and a second platform 162*b* spaced axially apart from the first platform 162*a* for supporting a second end of both substrates 102*a*, 102*b* proximate the second ports 108*b*. The heated, cooled, and intermediate sections 114, 116, 118 of the plurality of substrates 102*a*, 102*b* extend axially across a gap between the first and second platforms 162*a*, 162*b*, and are spaced laterally apart from each other. In the example illustrated, each platform 162 has a lower portion 164 and an upper portion 166 mounted overtop of the lower portion 164. The ends of the substrates 102, including the ports 108, are held between the upper and lower portions 164, 166 of the platforms 162. In the example illustrated, the platforms 162 are configured to serve as manifolds to facilitate connection of the pump system 130 to respective ports 108 (inlets and outlets), with the ports 108 accessible through the lower portions 164 for connection to the pump system 130.

Referring to FIG. 1, in the example illustrated, the calorimeter system 10 includes a control system 150 (FIG. 1) having at least one processor 152 configured to control operation of the device 100 to determine the specific heat capacity of sample fluids (e.g., according to the method 300 described below). In the example illustrated, the control system 150 is in communication with, and controls the operation of, the heat transfer system 120, the pump system 130, and the sensor system 140. The control system 150 can send control signals to the heat transfer system 120 and pump system 130, and receive sensor signals from the temperature sensor system 140 for measurement of the temperature differential and evaluation of the specific heat capacity of sample fluids based on the measurements. The control system 150 can be local, and/or include one or more remote components for controlling operation and/or processing data remotely.

Figure 5:
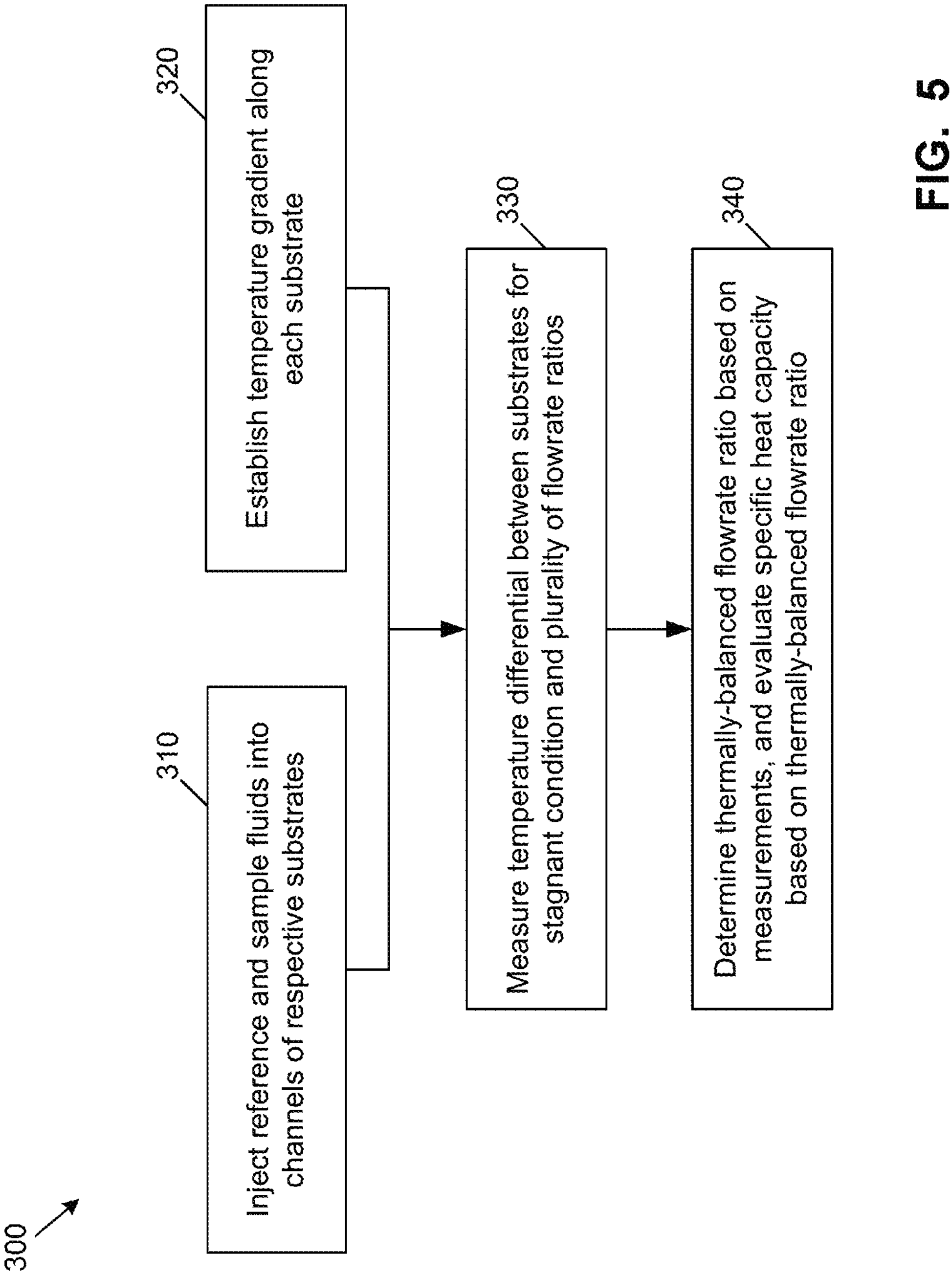
FIG. 5 is a flowchart showing an example method for determining specific heat capacity of fluids using a calorimeter system like that of FIG. 1.

Referring to FIG. 5, an example method 300 of determining specific heat capacity using the example device 100 is shown. The control system 150 can control the operation of the device 100 to perform the method 300, and/or one or more steps may be carried out and/or controlled by an operator.

At step 310 of the method 300, the reference fluid is injected into the channels 106 of reference substrate 102*a*, and the sample fluid is injected into the channels 106 of the sample substrate 102*b*. The fluids can be injected through, for example, the operation of the pump system 130.

At step 320, the temperature gradient $T_G$ is established along the channels 106 of each substrate 102. In the present example, the temperature gradient $T_G$ is established along the intermediate section 118 of each substrate 102 by operating the heat transfer system 120 to maintain the heated section 114 of each substrate 102 at the same constant first temperature $T_H$ and the cooled section 116 of each substrate 102 at the same constant second temperature $T_C$. The temperature gradient $T_G$ can have a slope of, for example, 0.1-1° C./mm. In some examples, the temperature gradient $T_G$ can have a range of, for example, at least 5° C. by setting the first temperature $T_H$ at least 5° C. greater than the second temperature $T_C$. This can provide relatively reliable results using the differential thermocouple 144 to measure the temperature differential. In some examples, the temperature gradient $T_G$ may have a range that is less than 5° C., such as 2.5-5° C., in which case more-sensitive temperature sensor equipment (e.g., thermopiles) may be helpful to obtain reliable results.

At step 330, the temperature differential between the reference location 110 and the sample location 112 is measured. In the example illustrated, measuring the temperature differential includes receiving voltage signals representative of the temperature differential from the differential thermocouple 144. The temperature differential is measured for the stagnant condition in which the reference and sample fluids are stagnant in respective channels 106 to define a baseline temperature differential. Defining the baseline temperature differential can serve as a calibration step, and help reduce the effect of confounding variables such as, for example, different thermal conductivities of the reference and sample fluids and/or slight deviations from symmetry. The temperature differential is also measured for a plurality of flowrate ratios (each defined by a different sample flowrate relative to a constant reference flowrate).

At step 340, the measurements in step 330 are used to determine a thermally-balanced flowrate ratio. The thermally-balanced flowrate ratio corresponds to the flowrate ratio of the sample flowrate relative to the reference flowrate at which the temperature differential corresponds to the baseline temperature differential.

In some examples, the thermally-balanced flowrate ratio can be determined by incrementally and/or iteratively adjusting the sample flowrate (while maintaining the constant reference flowrate) until the measured temperature differential corresponds to the baseline temperature differential. For example, according to FIG. 6B, calibrated flowrate voltage signals 425 (corresponding to temperature differential) for each flowrate ratio are plotted as a function of time, and relative to a baseline voltage signal 430 (corresponding to the baseline temperature differential for the stagnant condition). The thermally-balanced flowrate ratio can be determined by adjusting the sample flowrate until the flowrate voltage signal 425 corresponds to the baseline voltage signal 430 (set at 0 in the present example), and selecting the corresponding flowrate ratio (e.g., about 2.4 in the present example) as the thermally-balanced flowrate ratio. This may require waiting for steady state temperature conditions for each increment/iteration of the sample flowrate, and so may increase total sampling time based on the number of increments/iterations required to identify the thermally-balanced flowrate ratio.

In some examples, sampling time may be reduced by determining a functional relation between the flowrate ratios (e.g., two or more flowrate ratios) and corresponding temperature differentials measured at step 330, and evaluating the thermally-balanced flowrate ratio based on the functional relation. For example, referring to FIG. 6C, the example graph 440 shows the averaged, calibrated flowrate voltage signals 445 (corresponding to temperature differential) as a function of flowrate ratios (and relative to the baseline voltage signal 430 corresponding to the baseline temperature differential and set at 0 in the present example). The functional relation (e.g., represented by fitted line 450 in the present example) can be determined based on the flowrate voltage signals (e.g., signals 445) received for two or more flowrate ratios, and can be used to evaluate the thermally-balanced flowrate ratio at which the flowrate voltage signal corresponds to the baseline voltage signal (e.g., the flowrate ratio at which the fitted line 450 intersects the baseline voltage signal of 0 in the present example).

The unknown specific heat capacity of the sample fluid can then be evaluated based on the thermally-balanced flowrate ratio. As outlined above, the energy transfer by the reference and sample fluids can depend on the volumetric flowrate, density, and specific heat capacity of each fluid. Upon determining the thermally-balanced flowrate ratio, and knowing the density of each fluid and specific heat capacity of the reference fluid, the unknown specific heat capacity of the sample fluid (the remaining variable) can be resolved.

Figure 7:
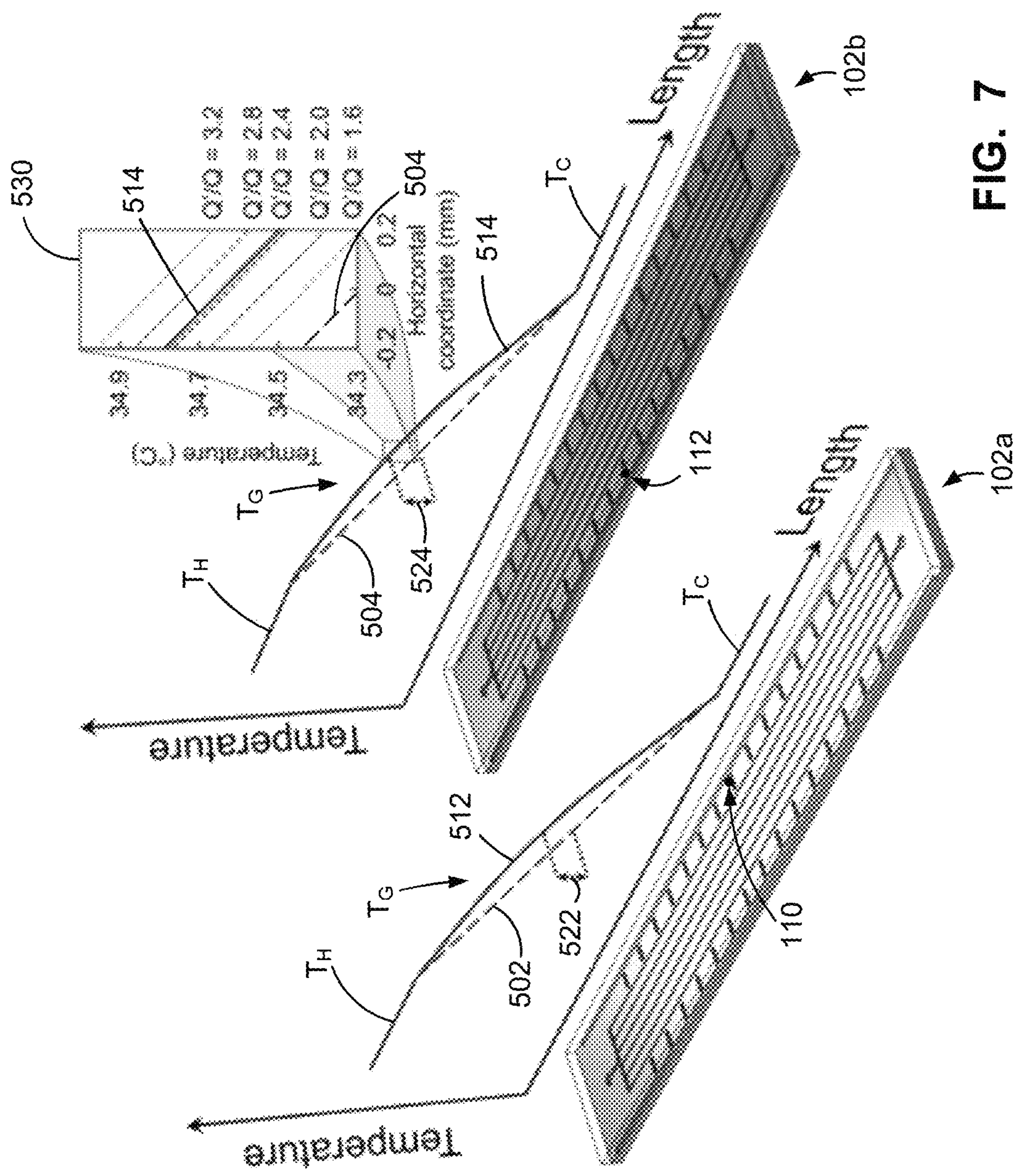
FIG. 7 is a perspective view of reference and sample substrates of the calorimeter system of FIG. 1, with a graphical overlay showing example temperature gradient profiles along each substrate.

To further illustrate aspects of the present teachings, reference is made to FIG. 7, which shows the reference and sample substrates 102*a*, 102*b* with a graphical overlay representing the temperature gradient $T_G$ established along each substrate 102. In this example, the reference fluid is water, and the sample fluid is butyl acetate. For the stagnant condition, the temperature gradient $T_G$ established along the reference substrate 102*a* is shown having a reference baseline profile 502, and the temperature gradient $T_G$ established along the sample substrate 102*b* is shown having a similar sample baseline profile 504.

In the example illustrated, at each flowrate ratio, the reference and sample fluids transfer energy from the heated section toward the cooled section of respective substrates 102, thereby disturbing respective baseline profiles 502, 504. The transfer of energy is a function of the volumetric flowrate, density, and specific heat capacity of each fluid.

At the constant reference flowrate, the reference fluid disturbs the temperature gradient $T_G$ along the reference substrate 102*a* to produce a reference substrate temperature profile 512. The reference substrate temperature profile 512 has a reference deviation 522 at the reference location 110 relative to the reference baseline profile 502. Similarly, at each sample flowrate, the sample fluid disturbs the temperature gradient $T_G$ along the sample substrate 102*b* to produce a sample substrate temperature profile 514. Each sample substrate temperature profile 514 has a sample deviation 524 at the sample location 112 relative to the sample baseline profile 504. An enlarged portion 530 in FIG. 7 shows a comparison of a plurality of sample substrate temperature profiles (and corresponding deviations) for different sample flowrates relative to the sample baseline profile 504.

In the example illustrated, the thermally-balanced flowrate ratio corresponds to the sample flowrate that produces a sample deviation 524 at the sample location 112 which is generally equal to the reference deviation 522 produced at the reference location 110 by the reference fluid flowing at the constant reference flowrate. In other words, at the thermally-balanced flowrate ratio, the strength of both the reference and sample fluids in changing the temperature of the chips at respective midpoints becomes generally equal.

In some examples, the temperature deviations 522, 524 may be on the order of a tenth of a degree Centigrade, and the corresponding voltage signals generated by the differential thermocouple 144 may be on the order of microvolts. The use of a thermopile can help amplify the voltage signals, and may help improve accuracy in some examples. Furthermore, as shown in FIG. 7, the deviation in the temperature gradient profile is largest near the midpoint of the temperature gradient $T_G$, and using the midpoint as the reference and sample locations can help produce larger voltage signals relative to locations farther from the midpoint. Using the midpoint as the sample and reference locations can also simplify calculations of the sampling temperature at which the specific heat capacity is determined, as the temperature at the midpoint is generally equal to the average of the first and second temperatures $T_H$, $T_C$ (assuming a linear temperature gradient).

In the example of FIG. 7, the fluids flow in a first flow direction along respective temperature gradients from the first (hotter) temperature $T_H$ toward the second (cooler) temperature $T_C$. Determination of the specific heat capacity can also be performed for the opposite, second flow direction along the temperature gradient, from the second (cooler) temperature $T_C$ toward the first (hotter) temperature $T_H$. In some examples, steps 330 and 340 of the method 300 can be repeated a plurality of times to determine the specific heat capacity one or more times with the fluids flowing in the first flow direction, and one or more times with the fluids flowing in the second flow direction (e.g., through the reverse operation of the pump system). This can reduce the required volume of the reference and sample fluids, by moving small volumes of fluid back and forth several times along the temperature gradient to yield several data points.

In some examples, the systems and methods disclosed herein can be adapted for a multiplex configuration, in which multiple symmetric sample fluid channels that are in fluid isolation from each other are used to determine specific heat capacities of different, respective sample fluids relative to the same reference fluid. For example, the system 100 can be adapted to include the one reference substrate and a plurality of sample substrates, each sample substrate having respective channel(s) for conducting different sample fluids at respective sample flowrates. The pump system can be adapted to pump the different sample fluids independently through the channel(s) of a respective substrate at the respective sample flowrates. The heat transfer system can establish the temperature gradient along the reference substrate and each sample substrate. The temperature differential system can include additional sensor elements to measure a respective temperature differential between the reference substrate and each sample substrate, to determine a thermally-balanced flowrate ratio and specific heat capacity of each sample fluid generally simultaneously according to the methods disclosed herein.

Figure 8B:
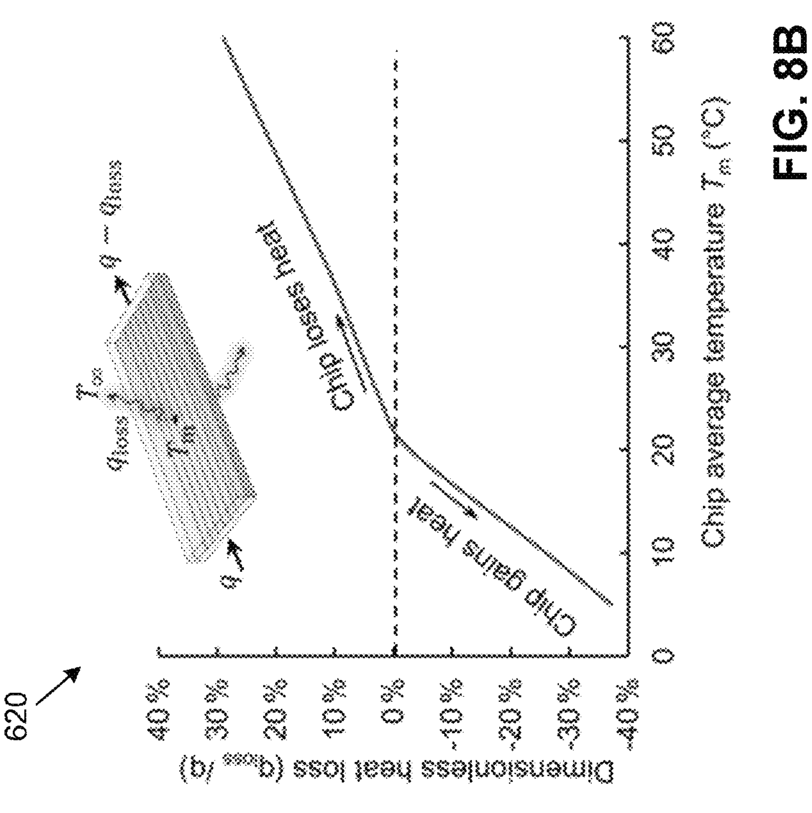
FIG. 8B is a graph showing dimensionless heat loss of a substrate like that of FIG. 4A as a function of the average temperature of the substrate.
Figure 8A:
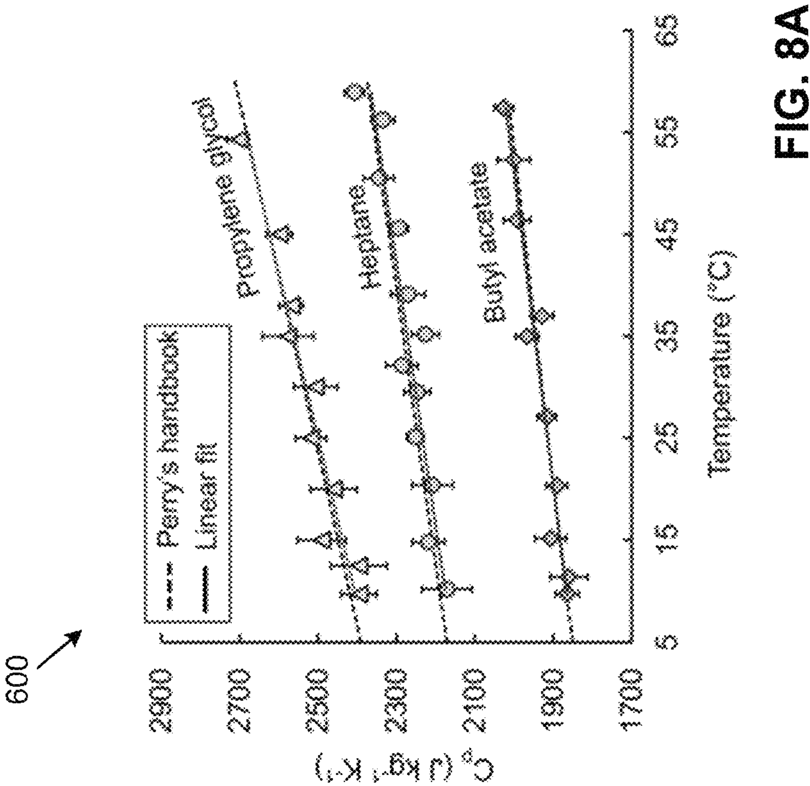
FIG. 8A is a graph showing specific heat capacities determined for three different sample fluids at various temperatures using a calorimeter system like that of FIG. 1, and relative to accepted literature values.

Referring to FIG. 8A, an example graph 600 shows specific heat capacity determined for three example sample fluids (propylene glycol, heptane, and butyl acetate) as a function of temperature. The solid lines show a linear fit for the specific heat capacities determined using a calorimeter device like the device 100 of FIG. 2. The dashed lines show accepted literature values for each sample fluid, which align in close agreement with the solid lines representing the experimental results.

Referring to FIG. 8B, an example graph 620 shows dimensionless heat loss of an example substrate (like the microfluidic chip 200), as a function of the average temperature of the substrate. The dimensionless heat loss is defined as the ratio of heat given to the ambient relative to the total conductive heat flux transported along the substrate. While the graph 620 indicates an estimated 30% heat loss from the substrate to the ambient at 60° C. and a 28% heat gain from the ambient to the substrate at 10° C., the calorimeter device may nonetheless offer relatively high accuracy determination of the specific heat capacity at both temperature extremes.

Figures 8C, 8D:
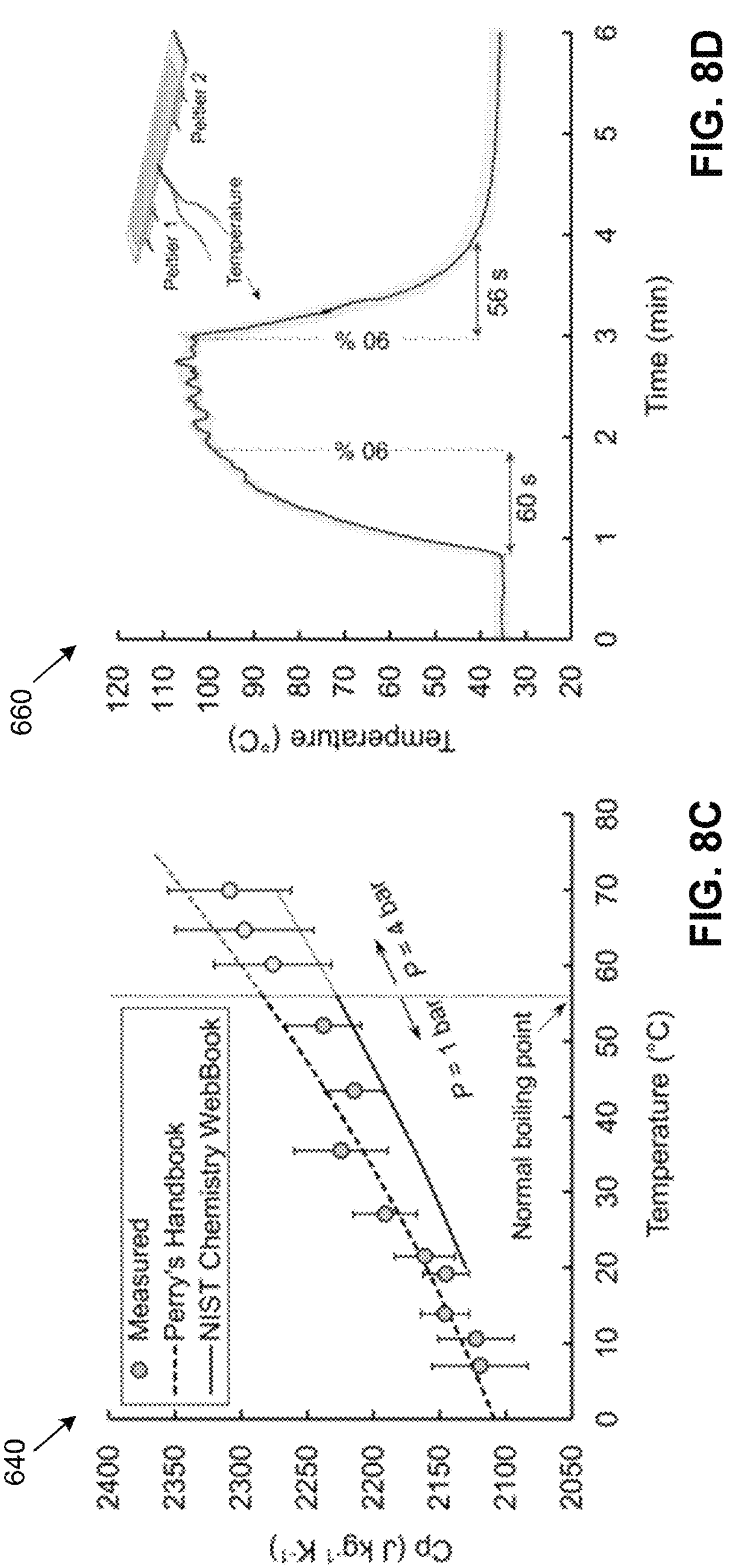
FIG. 8C is a graph showing the specific heat capacity determined for a sample fluid at various temperatures using a calorimeter system like that of FIG. 1, with the temperatures extending beyond the normal boiling temperature of the sample fluid under increased pressure, and relative to accepted literature values.
FIG. 8D is a graph showing the thermal response over time of a substrate like that of FIG. 4A to a step increase and a step decrease in heat input.

Referring to FIG. 8C, an example graph 640 shows specific heat capacity determined for an example sample fluid (acetone) using a calorimeter device like the device 100 of FIG. 2. The determined specific heat capacity is plotted as a function of temperature, with the temperature extending beyond the normal boiling temperature of the sample fluid (56.2° C. for acetone). The sample fluid pressure was increased to 4 bars to avoid the sample fluid boiling. The solid line and the dashed line show the correlation of the determined specific heat capacities (shown as dots) to accepted literature values for the sample fluid at each temperature. The determined specific heat capacities for the sample fluid at each temperature, including above the normal boiling point of the sample fluid and under increased pressure, are in close agreement with the corresponding accepted literature values.

Referring to FIG. 8D, an example graph 660 shows the thermal response at the midpoint of a chip like the microfluidic chip 200. The temperature of the chip is shown as a function of time. After a step increase in the temperature input from the thermoelectric modules, 90% of the thermal response of the chip occurred within about 60 seconds. Similarly, after a step decrease returning to the initial input temperatures of the thermoelectric modules, 90% of the thermal response of the chip occurred within about 56 seconds. The given thermal responses are the combined effect of the responses of the silicon chips and the Peltier devices, and the silicon chips alone may have a faster thermal response.

Figures 9, 10:
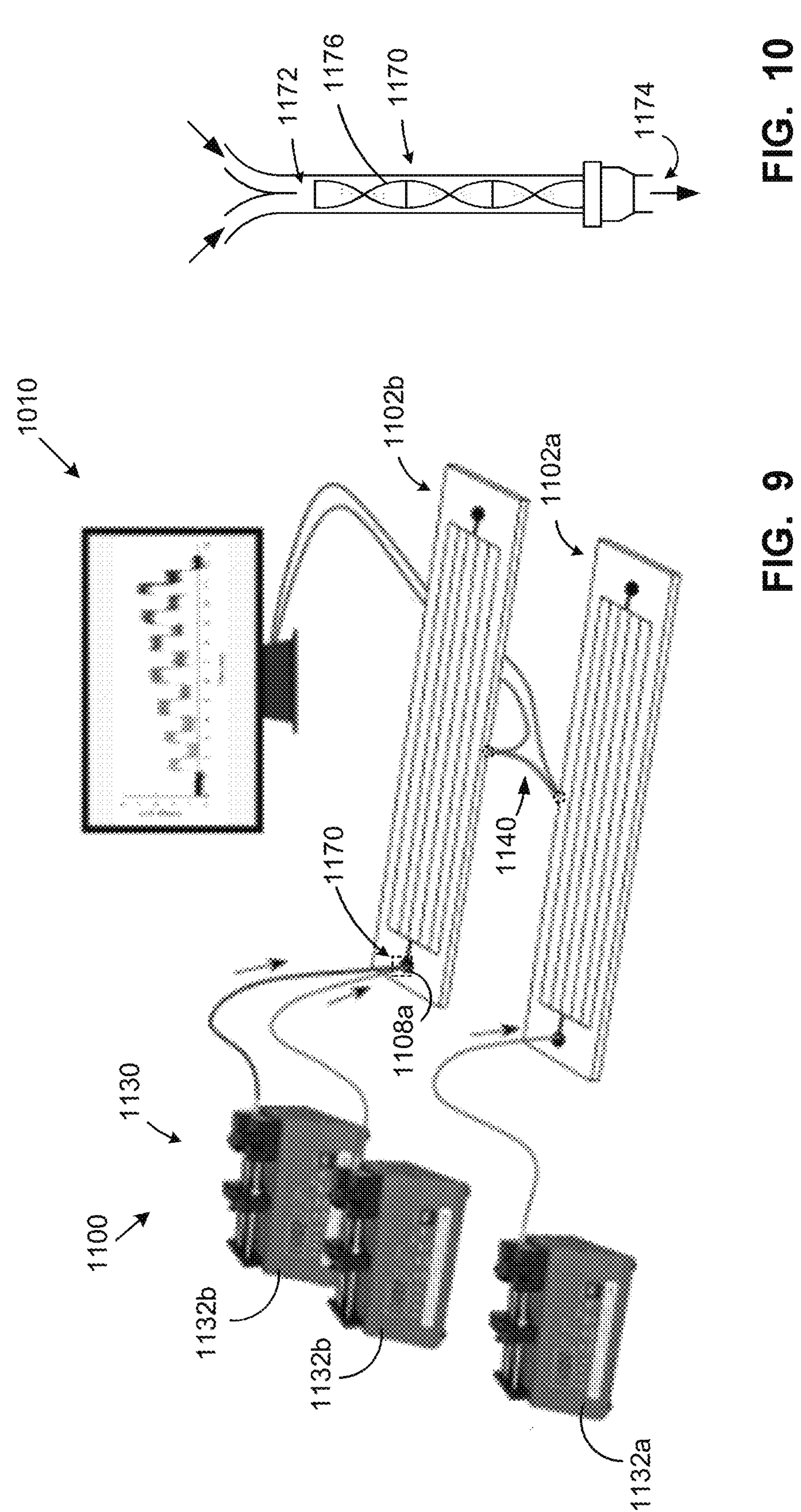
FIG. 9 is a perspective view of another example continuous flow calorimeter system.
FIG. 10 is a schematic side view of a static mixer for mixing fluids to produce a sample fluid for the calorimeter system of FIG. 9.

Referring to FIG. 9, portions of another example calorimeter system 1010 are shown. The calorimeter system 1010 has similarities to the calorimeter system 10, and like features are identified with like reference characters, incremented by 1000.

In the example illustrated, the calorimeter system 1010 includes a calorimeter device 1100. The calorimeter device 1100 has a reference substrate 1102*a*, a sample substrate 1102*b*, a heat transfer system (not shown), a pump system 1130, and a sensor system 1140. The pump system 1130 includes a reference fluid pump 1132*a* and a pair of sample fluid pumps 1132*b* for pumping respective first and second fluids. In the example illustrated, the pump system 1130 includes a static mixer 1170 for mixing the first and second fluids received from the sample fluid pumps 1132*b* to produce the sample fluid. This can allow for, for example, continuous and automated determination of specific heat capacity for a plurality of different sample fluids, each having a different volume concentration (or molality) of the first and second fluids (e.g., through adjustment of the flowrate ratio for the first and second fluids).

Referring to FIG. 10, in the example illustrated, the static mixer 1170 has a mixer inlet 1172 in fluid communication with each sample fluid pump 1132*b*, a mixer outlet in fluid communication with the port 1108*a* (serving as an inlet) of the sample substrate 1102*b*, and a plurality of static mixing elements 1176 (e.g., helical blades) between the mixer inlet 1172 and the mixer outlet 1174. The mixing elements 1176 induce mixture of the first and second fluids flowing into the static mixer from the sample fluid pumps 1132*b* to produce a generally homogenous sample fluid for pumping through the inlet 1108*a* of the sample substrate 1102*b*.

Figure 11:
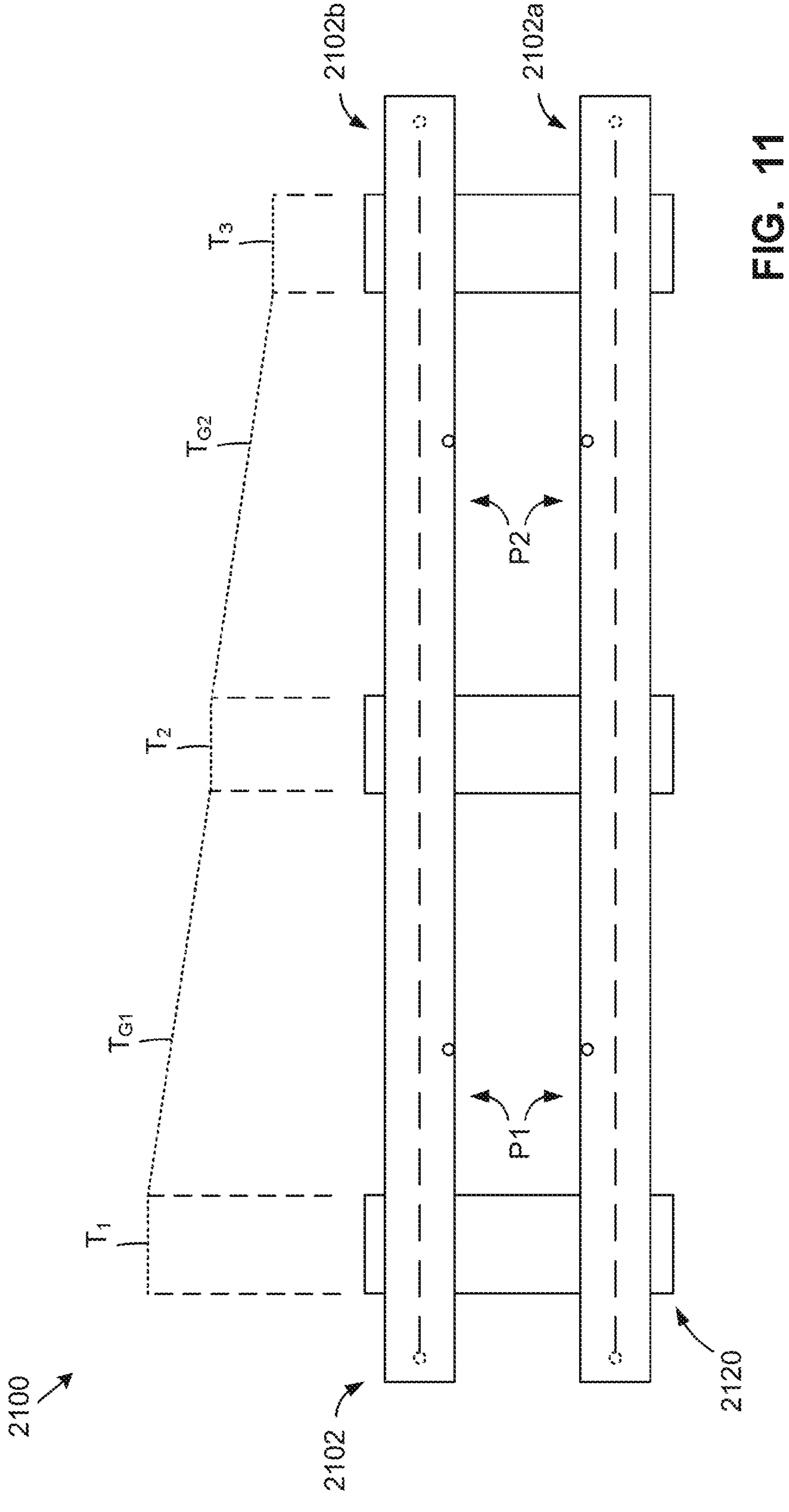
FIG. 11 is a schematic top view of portions of another example continuous flow calorimeter system, showing temperature gradients established along a pair of substrates of the calorimeter system.

Referring to FIG. 11, portions of another example calorimeter device 2100 are shown. The calorimeter device 2100 has similarities to the calorimeter device 100, and like features are identified with like reference characters, incremented by 2000.

In the example illustrated, the device 2100 has a plurality of substrates 2102 (including a reference substrate 2102*a* and a sample substrate 2102*b*), and a heat transfer system 2120 operable to establish a plurality of temperature gradient pairs P1, P2 spaced axially apart from each other along the substrates 2102. In the example illustrated, the temperature gradient $T_{G1}$ for the first gradient pair P1 transitions between temperatures $T_1$, $T_2$. The temperature gradient $T_{G2}$ for the second gradient pair P2 transitions between temperatures $T_2$, $T_3$. In such examples, a thermally-balance flowrate ratio can be determined for each temperature gradient pair P1, P2 to evaluate specific heat capacity for a plurality of different temperatures and/or gradient profiles.

The invention claimed is:

1. A method for determining specific heat capacity of fluids, comprising:

a) injecting a reference fluid having a known specific heat capacity into at least one channel extending along a reference substrate and a sample fluid having an unknown specific heat capacity into at least one channel extending along a sample substrate;

b) establishing a temperature gradient along the at least one channel of each substrate;

c) measuring a temperature differential between a reference location along the temperature gradient of the reference substrate and a corresponding sample location along the temperature gradient of the sample substrate, the temperature differential being measured for a stagnant condition in which the reference and sample fluids are stagnant in respective channels to define a baseline temperature differential, and for each of a plurality of flowrate ratios, each flowrate ratio defined by a different sample flowrate at which the sample fluid flows through the at least one channel of the sample substrate relative to a constant reference flowrate at which the reference fluid flows through the at least one channel of the reference substrate; and d) based on the measuring in (c), determining a thermally-balanced flowrate ratio of the sample flowrate relative to the reference flowrate at which the temperature differential corresponds to the baseline temperature differential, and evaluating the unknown specific heat capacity based on the thermally-balanced flowrate ratio.

2. The method of claim 1, wherein each substrate comprises a respective microfluidic chip and the at least one channel comprises at least one microfluidic channel in the chip.

3. The method of claim 1, wherein the measuring in (c) comprises receiving voltage signals representative of the temperature differential from at least one differential thermocouple comprising at least one reference junction at the reference location and at least one sample junction at the sample location.

4. The method of claim 1, wherein each of the reference location and the sample location is at a midpoint along the temperature gradient of a respective substrate.

5. The method of claim 1, further comprising determining a functional relation between the plurality of flowrate ratios and corresponding temperature differentials measured in (c), and wherein the determining in (d) comprises evaluating the thermally-balanced flowrate ratio based on the functional relation.

6. The method of claim 1, wherein the temperature differential is measured using a temperature-differential sensor system including at least one thermoelectric sensor having at least one reference sensor element positioned at the reference location along the temperature gradient of the reference substrate and at least one sample sensor element positioned at the corresponding sample location along the temperature gradient of the sample substrate.

7. The method of claim 1, wherein the reference substrate and the sample substrate are generally identical and interchangeable.

8. The method of claim 1, wherein each of the at least one channel extending along the reference substrate and the at least one channel extending along the sample substrate comprises a plurality of channels extending generally parallel with each other.

9. The method of claim 1, wherein (b) comprises maintaining a heated section of each substrate at a first temperature and maintaining a cooled section of each substrate at a second temperature that is less than the first temperature to establish the temperature gradient between the heated and cooled sections.

10. The method of claim 9, wherein the heated section is maintained at the first temperature by a thermoelectric heater, and the cooled section is maintained at the second temperature by a thermoelectric cooler.

11. The method of claim 1, further comprising operating a pump system to pump the reference fluid and the sample fluid at the plurality of flowrate ratios.

12. The method of claim 11, wherein operating the pump system includes operating a reference fluid pump to pump the reference fluid through the at least one channel extending along the reference substrate at the constant reference flowrate, and operating at least one sample fluid pump to pump the sample fluid at each different sample flowrate.

13. The method of claim 12, wherein the at least one sample fluid pump comprises a plurality of fluid pumps for pumping respective fluids, and the pump system includes a mixer for mixing the respective fluids when being pumped to produce the sample fluid.

14. A method for determining specific heat capacity of fluids comprising:

a) injecting a reference fluid into at least one reference channel and a sample fluid into at least one sample channel;

b) establishing a temperature gradient along the at least one reference channel and along the at least one sample channel;

c) measuring a temperature differential between the at least one reference channel and the at least one sample channel, including for a plurality of flowrate ratios, each flowrate ratio defined by a reference flowrate of the reference fluid and a sample flowrate of the sample fluid; and d) based on the measuring in (c), determining a thermally-balanced flowrate ratio of the sample flowrate relative to the reference flowrate at which a strength of both the reference and sample fluids in changing the temperature gradient along respective channels becomes generally equal, and evaluating the specific heat capacity of the sample fluid based on the thermally-balanced flowrate ratio.

15. The method of claim 14, wherein each of the at least one reference channel and the at least one sample channel comprises at least one microfluidic channel.

16. The method of claim 14, wherein in (c), the temperature differential is measured for a stagnant condition in which the reference and sample fluids are stagnant in respective channels to define a baseline temperature differential, and for each of the plurality of flowrate ratios.

17. The method of claim 16, wherein each flowrate ratio is defined by a different sample flowrate at which the sample fluid flows through the at least one sample channel relative to a constant reference flowrate at which the reference fluid flows through the at least one reference channel.

18. The method of claim 17, wherein the thermally-balanced flowrate ratio corresponds to the flowrate ratio of the sample flowrate relative to the reference flowrate at which the temperature differential corresponds to the baseline temperature differential.

19. The method of claim 18, wherein the thermally-balanced flowrate ratio is determined by adjusting the sample flowrate while maintaining the reference flowrate constant until the measured temperature differential corresponds to the baseline temperature differential.

* * * * *